(12) United States Patent
Sieckmann

(10) Patent No.: US 7,495,778 B2
(45) Date of Patent: Feb. 24, 2009

(54) METHOD AND DEVICE FOR OPTICALLY EXAMINING AN OBJECT

(75) Inventor: Frank Sieckmann, Bochum (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 81 days.

(21) Appl. No.: 10/489,391

(22) PCT Filed: Sep. 10, 2002

(86) PCT No.: PCT/EP02/10122

§ 371 (c)(1),
(2), (4) Date: Sep. 27, 2004

(87) PCT Pub. No.: WO03/023482

PCT Pub. Date: Mar. 20, 2003

(65) Prior Publication Data

US 2005/0031192 A1 Feb. 10, 2005

(30) Foreign Application Priority Data

Sep. 11, 2001 (DE) .............................. 101 44 709
Sep. 4, 2002 (DE) .............................. 102 41 290

(51) Int. Cl.
*G01B 11/24* (2006.01)
(52) U.S. Cl. .................. 356/609; 250/201.3; 250/201.7
(58) Field of Classification Search ................. 356/601, 356/609
See application file for complete search history.

(56) References Cited

U.S. PATENT DOCUMENTS

| | | | |
|---|---|---|---|
| 3,987,243 A * | 10/1976 | Schwartz | 348/625 |
| 4,160,598 A * | 7/1979 | Firester et al. | 356/121 |
| 4,689,491 A | 8/1987 | Lindow et al. | 250/572 |
| 4,942,618 A * | 7/1990 | Sumi et al. | 356/609 |
| 5,151,609 A * | 9/1992 | Nakagawa et al. | 356/609 |
| 5,305,092 A * | 4/1994 | Mimura et al. | 356/609 |
| 5,790,710 A * | 8/1998 | Price et al. | 382/255 |
| 5,804,813 A | 9/1998 | Wang et al. | 250/201.3 |
| 6,055,097 A | 4/2000 | Lanni et al. | 359/386 |

(Continued)

FOREIGN PATENT DOCUMENTS

DE 42 04 268 8/1993

(Continued)

OTHER PUBLICATIONS

H. J. Tiziani et al.: "Three-dimensional image sensing by chromatic confocal microscopy", Applied Optics, Optical Society of America, Washington, vol. 33, No. 10, Apr. 1, 1994, pp. 1838-1843.

(Continued)

*Primary Examiner*—Gregory J Toatley, Jr.
*Assistant Examiner*—Juan D Valentin
(74) *Attorney, Agent, or Firm*—Darby & Darby

(57) ABSTRACT

A device for optically examining an object includes a lens, an object stage for receiving the object, and an image-recording apparatus for recording a series of individual images of the object in a number of planes. A piezo-controlled apparatus is provided for adjusting the distance between the lens and the object, and an image-generating apparatus is provided for generating a multifocus image from the series of individual images.

29 Claims, 23 Drawing Sheets

U.S. PATENT DOCUMENTS

| | | | |
|---|---|---|---|
| 6,128,077 A | 10/2000 | Jovin et al. | 356/310 |
| 6,433,325 B1 * | 8/2002 | Trigg | 250/201.3 |
| 6,693,716 B2 | 2/2004 | Sieckmann | 356/609 |
| 2002/0071125 A1 * | 6/2002 | Sieckmann | 356/609 |

FOREIGN PATENT DOCUMENTS

| | | |
|---|---|---|
| DE | 195 17 300 | 11/1996 |
| DE | 196 32 637 | 2/1998 |
| DE | 101 49 357 | 4/2002 |
| EP | 0 244 640 | 11/1987 |
| EP | 0769159 | 3/1999 |
| JP | 05288995 A * | 11/1993 |
| JP | 11-174334 | 7/1999 |
| JP | 2000-316120 | 11/2000 |

OTHER PUBLICATIONS

A. Erhardt et al.: "Reconstructing 3-D light-microscopic images by digital image processing", Applied Optics, Optical Society of America, Washington, vol. 24, No. 2, Jan. 15, 1985, pp. 194-200.

J. W. Goodman: "Introduction to Fourier Optics", McGraw-Hill Inc., New York, 1968, pp. 101-121.

International Search Report for PCT/EP02/10122, Jan. 2, 2003, 3 pages.

* cited by examiner

METHOD AND DEVICE FOR OPTICALLY EXAMINING AN OBJECT

The invention relates to a device for optically examining an object, having a lens and an object stage for receiving the object and it also relates to a method for optically examining an object.

BACKGROUND

When specimens are examined under a microscope, there is often a need to reconstruct the three-dimensional shape of the surface of the object. Confocal scanning microscopy, for example, can be employed for this purpose. In such a case, a specimen is scanned point-by point with the focus of a light beam in a plane, so that an image is obtained in this image plane, although with only a small depth of focus. By recording several different planes and appropriately processing the images, the object can then be imaged three-dimensionally. Such a confocal scanning microscope method is known, for example, from U.S. Pat. No. 6,128,077. The optical components employed in confocal scanning microscopy, however, are very expensive and, in addition to sophisticated technical knowledge, they also require a great deal of adjustment work.

Furthermore, U.S. Pat. No. 6,055,097 discloses a method for luminescence optical microscopy. Here, a specimen is marked with dyes that are fluorescent under suitable illumination conditions, so that the dyes in the specimen can be localized by the irradiation. In order to generate a spatial image, a number of images are recorded in different focal planes. Each of these images contains image information stemming directly from the focal plane as well as image information stemming from spatial sections of the object that lie outside of the focal plane. For purposes of obtaining a sharp image, it is necessary to eliminate the image components that do not stem from the focal plane. In this context, the suggestion is made to provide the microscope with an optical system that allows the specimen to be illuminated with a special illumination field, for instance, a stationary wave, or with a non-periodic excitation field.

In order to improve the three-dimensional reconstruction of an object with a microscope, German patent application no. 100 50 963.0 proposes an improved method and an improved device. Here, an image-recording device, for example, a CCD camera, is used to record a series of images of an object in various z planes. Consequently, this yields a stack of plane images of the object from numerous different planes in the z direction of the object. Each of these images in the image stack contains areas of sharp image structures having a high sharpness of details and areas that were outside of the focal plane during the recording of the image and that are consequently present in the image in an unsharp state and without high sharpness of details. As a result, an image can be regarded as a set of partial image areas having different, especially high, sharpness of details and low sharpness of details. Image-analysis methods are then employed to extract the partial image areas from each image of the image stack, said areas being present in a high sharpness of details. Consequently, for each image of the image stack, a result image is obtained that now contains only the image areas of high sharpness. These result images are subsequently combined to form a new, detail-sharp three-dimensional overall image. The result is a new, completely detail-sharp three-dimensional microscopic image of the object.

Since the distances and the absolute positions of the z planes in which the images of the image stack were recorded are known, the three-dimensional microscopic image of the object thus obtained can also be evaluated quantitatively. Up until now, in order to record the individual images of the image stack in the various z planes, the distance between the lens and the object was changed by mechanically adjusting the height of the microscope stage, in other words, the stage on which the object rests. The high weight of the stage and the resultant inertia of the entire system, however, set a limit for the speed with which the individual image stacks can be recorded. After all, the inertia of the system means that a relatively long time is needed to move the object into the various z planes in the focus of the lens.

SUMMARY OF THE INVENTION

Therefore, an object of the present invention is to provide a device for examining an object and a method for examining an object by means of which the object can be reconstructed using a conventional optical light microscope in a manner entailing high speed and depth of focus.

The present invention provides a device for optically examining an object. The device includes a lens, an object stage configured to receive the object, and an image-recording apparatus configured to record a series of individual images of the object in a plurality of planes. A piezo-controlled apparatus configured to adjust a distance between the lens and the object, and an image-generating apparatus configured to generate a multifocus image from the series of individual images are also included in the device.

The present invention also provides a method for examining an object. The method includes recording a plurality of images using a lens and an image-recording device, and adjusting a position of a focal plane of the lens in the object using a piezo-controlled device prior to the recording of at least one of the images.

The use of a piezo-controlled means to adjust the distance between the lens and the object now makes it possible to move different z planes of the object into the focal area of the lens very precisely and rapidly. In this manner, the recording of a series of individual images in the various z planes of the object can be considerably accelerated. Consequently, a fast three-dimensional reconstruction of microscopic surfaces can be performed, also in the realm of the optical microscopic examinations of objects. Therefore, fast processes can be detected in a wide array of objects in a way that is three-dimensional and attains depth of focus. At the same time, it is ensured that the object is handled gently during the examination.

Since a lens is used for the proposed examination of the object and the object normally rests on an object stage, it is necessary to move different z planes of the object into the focal area of the lens. According to the invention, there are now basically several possibilities to move the desired z plane of the object into the focal area of the lens. It is possible to employ a piezo-controlled lens. In this case, the lens itself is fitted with a piezo actuator that can be actuated by a control device in such a way that it causes the lens to move and thus causes a movement of the focal plane of the lens.

In another embodiment of the invention, instead of moving the lens, it is possible to move the object on the stage or to move the stage with the object by means of a piezo-controlled actuator. This piezo-controlled actuator is connected to the object stage and coupled to a control device. The control device is able to actuate the piezo actuator in such a way that the object moves on the object stage in the z direction and thus a new z plane of the object moves into the focal area of the lens.

In another embodiment of the invention, both the lens and the object stage can be fitted with a piezo actuator whereby both are actuated by means of a control device so that the lens as well as the object stage or the object lying on the object stage can be moved in the z direction. Thus, in a simple manner, this can increase the optical path length by which the object can be moved in the z direction into the various focal planes. In another embodiment of the invention, both the lens and the object stage can be fitted with a piezo actuator and in addition, the object stage can have a conventional controllable adjustment unit (for instance, an electro-mechanical unit), in which case all of the units (lens piezo, stage piezo and electro-mechanical stage adjustment unit) are actuated by a control device so that both the lens and the object stage or the object lying on the object stage can be moved in the z direction. Thus, in a simple manner, this can even further increase the optical path length by which the object can be moved in the z direction into the various focal planes.

In all of the described embodiments of the invention, it is advantageous to record the individual images of the image stack—which are recorded in the various z planes—in z planes that are equidistant from each other. On the one hand, this facilities the image reconstruction and, on the other hand, it allows an extremely precise detection of the object in the z direction with the smallest possible z plane distances.

An aspect of the method under discussion here is the separation of the sharp image areas from the unsharp image areas in the individual planes. In this context, it has turned out that a considerable improvement of the image quality can be achieved if each individual plane image is computationally deconvoluted with an individual instrument profile. The term instrument profile refers to the imaging properties of the entire set-up which are described by the point spread function (PSF) or the optical transfer function (OTF) of the entire instrument lens system. Details about the point spread function are known to the person skilled in the art from pertinent publications such as, for example, "Introduction to Fourier Optics" by Joseph W. Goodman, published by McGraw-Hill, New York, 1968.

The effect of the deconvolution is that the imaging errors associated with the imaging system employed are removed from each plane image, in other words, the errors can be calculated out. Details on the mathematical deconvolution are likewise known to the skilled person from technical books. Advantageously, every single plane image is deconvoluted even before the start of the computation process that is use to ascertain and separate the sharp image areas. In this manner, each plane clearly acquires greater sharpness and the sharp image areas of each plane can be ascertained more easily. In order to increase the computation speed, it is also possible to only carry out the deconvolution with the multifocus image. However, the result of the deconvolution can be worse than with a deconvolution of all of the individual images, followed by a multifocus image computation.

With the device according to the invention and with the method according to the invention, the optical microscopic limit of a relatively low depth of focus of the image may now be overcome and, at the same time, a three-dimensional surface reconstruction of an object at a high speed may be performed by employing piezo-controlled actuators in order to position the focal planes in the object. In this manner, the microscopic image quality is improved, in addition to which the possibility exists to detect and evaluate rapid changes in the microscopic surface topologies through the modality of image analysis. Thus, the possibility also exists to perform real-time measurements of surface structures while concurrently eliminating the limitation in the image quality caused by an insufficient depth of focus.

BRIEF DESCRIPTION OF THE DRAWINGS

Additional advantages and advantageous embodiments of the invention are the subject matter of the schematic figures below and of their descriptions. For the sake of clarity, the depiction of these figures was not rendered to scale.

The drawings show the following.

DETAILED DESCRIPTION

Figure 1:
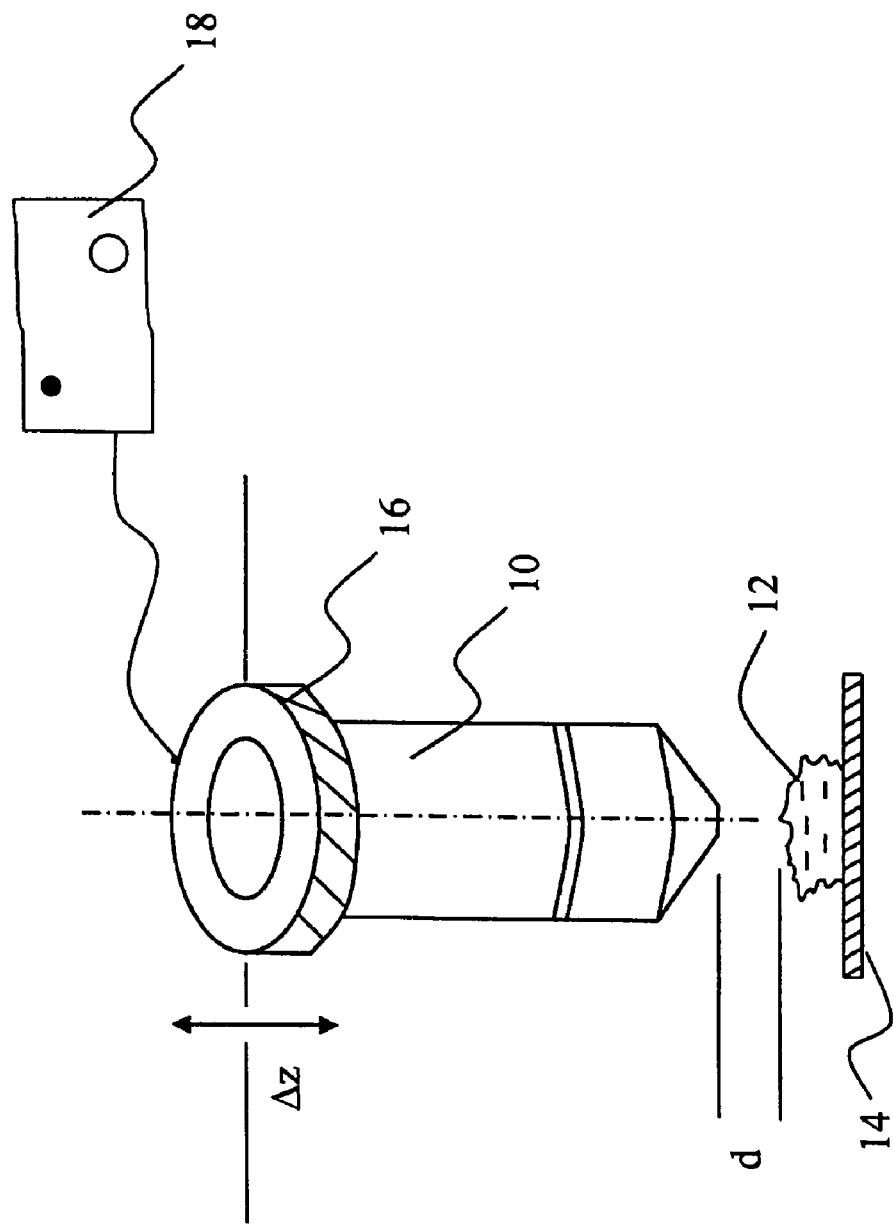
FIG. 1 a section of a device for examining an object with a piezo-controlled lens.

FIG. 1 schematically shows a section of a device for examining an object with a piezo-controlled lens. A lens 10 serves to examine an object 12 that has been placed onto an object stage 14. In order to generate an image with depth of focus as well as a three-dimensional surface profile of this object, according to the invention, a series of individual images are recorded, whereby each of these individual images lies in different z planes of the specimen. For this purpose, the focus of the lens 10 in the specimen must be positioned in such a way that it lies in the desired plane. That is achieved by adjusting the distance d between the lens and the object. In order to do so, the lens is provided with a piezo actuator 16 that is coupled to a control device 18. The piezo actuator 16 can be actuated with the control device 18 so that the lens 10 is moved, as is indicated by the double arrow. In this manner, the focus inside the object 12 can be adjusted with the piezo-controlled lens 10. This piezo actuator can move the lens extremely precisely and in very small increments $\Delta z$ which preferably lie in the range of the resolution capacity of the viewing light employed.

Once an individual image has been recorded in each desired z plane, the series of individual images is ready for further image processing. Preferably, the z planes lie equidistant from each other.

Figure 2:
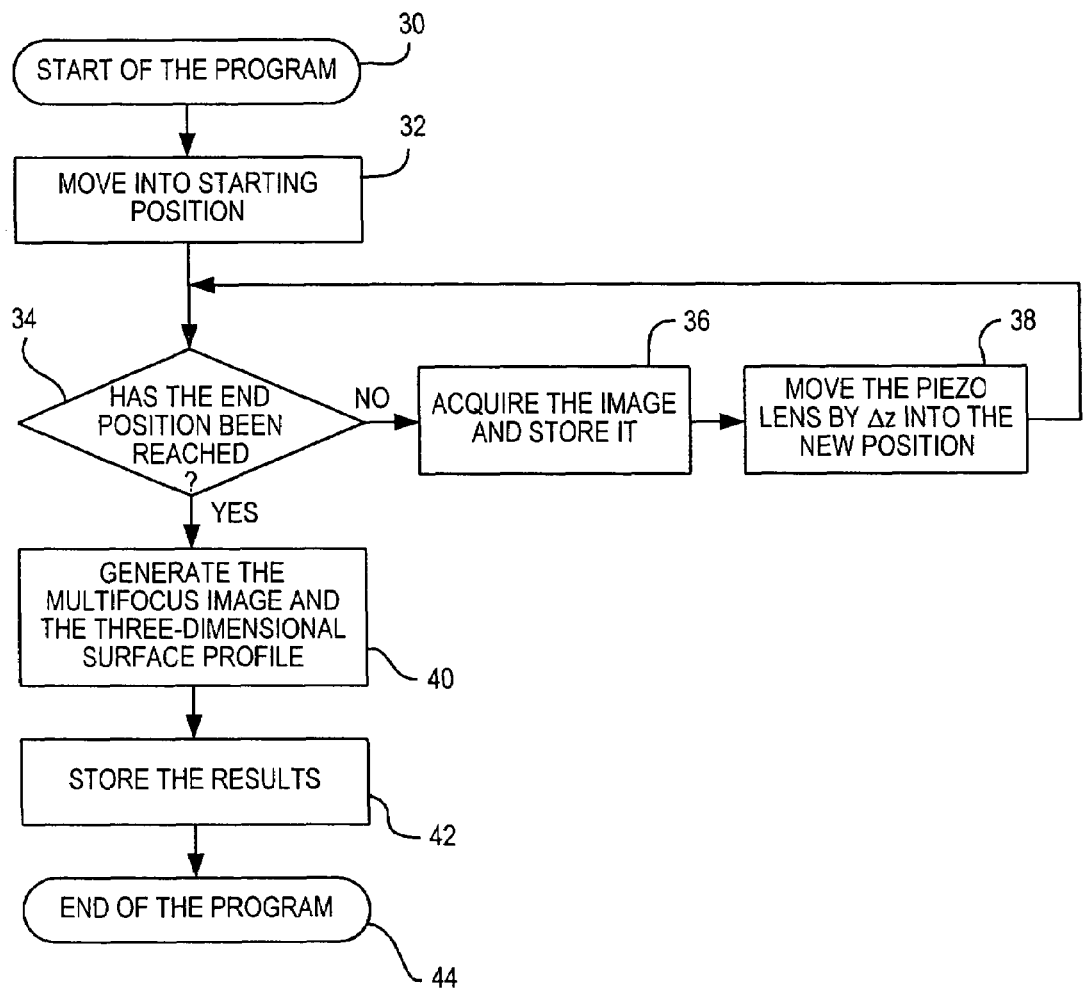
FIG. 2 a schematic depiction of the process sequence for examining an object with a piezo-controlled lens.

FIG. 2 now shows a schematic depiction of the process sequence for examining an object with a piezo-controlled lens, whereby the method if preferably realized employing software control. Following a coarse pre-adjustment of the distance between the lens and the object 12, the further operating sequence of the device can take place automatically. For this purpose, after the start 30 of the method, in step 32, the lens 10 is moved in the starting position by means of the piezo actuator 16. Subsequently, in step 34, a checking procedure ascertains whether the end position entered by the user or else determined automatically has already been reached. If this is not the case, then, in step 36, an analog or digital camera, preferably a CCD camera, is employed to record and store the image of this focal plane. Subsequently, in step 38, the control device 18 is utilized to actuate the piezo actuator 16 in such a way that the lens 10 is moved so that, in the object 12, the next z plane in which an image is to be recorded lies in the focus of the lens 10. This loop is repeated unit, in step 34, it is determined that the end position has been reached. Then, in step 40, a multifocus image is generated from the series of individual images and subsequently a three-dimensional surface profile is created. In step 42, this image is stored and the method ends with step 44.

Figure 3:
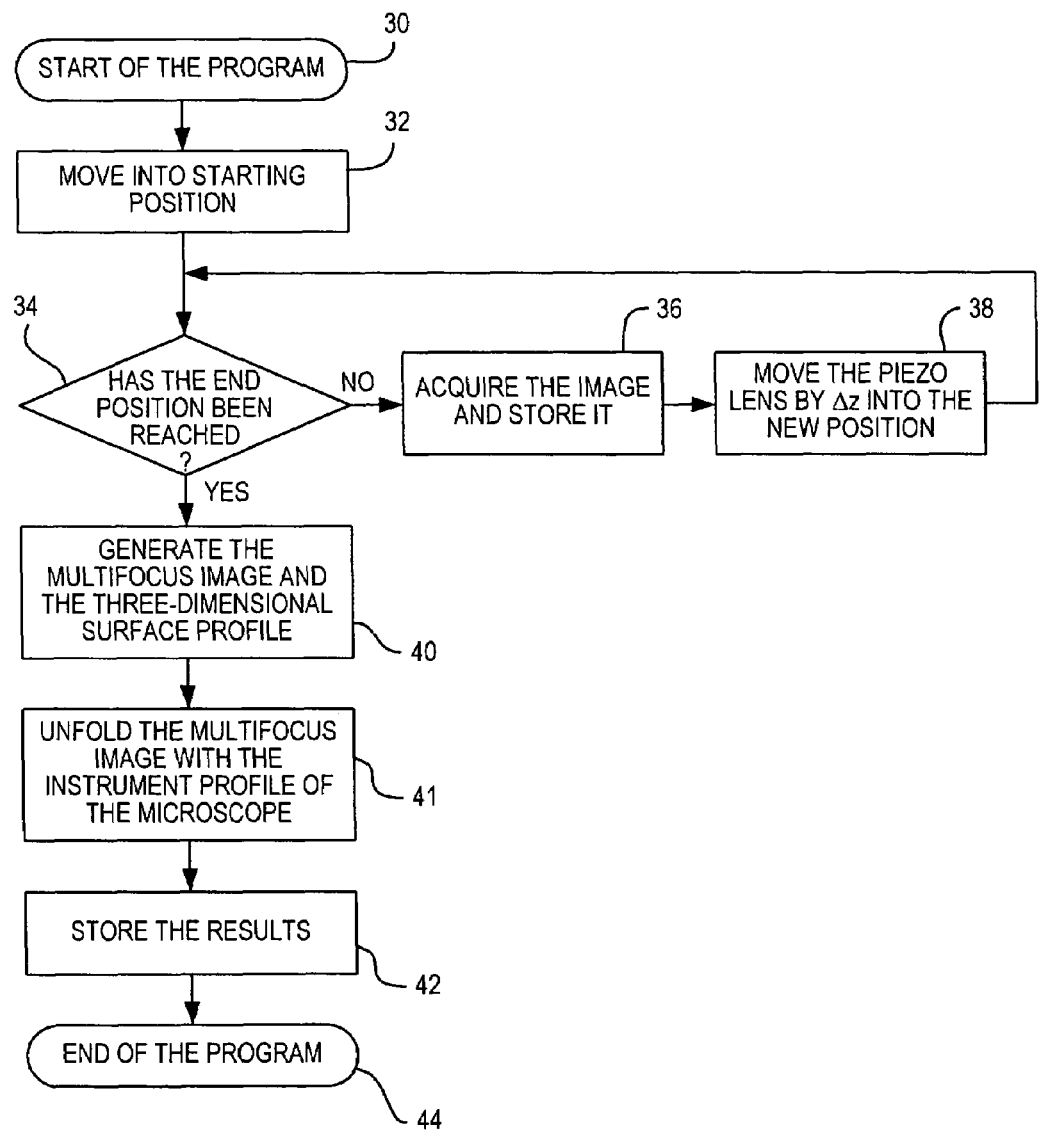
FIG. 3 a process sequence of an improved method for examining an object with a piezo-controlled lens.

FIG. 3 shows the process sequence of a method for examining an object in which the attained image quality is improved. In comparison to the method according to FIG. 2, an additional step 41 is inserted between steps 40 and 42 and in this step, the obtained multifocus image is deconvoluted with the instrument profile of the microscope. In fact, it has been found that a marked improvement in the image quality can be achieved if the multifocus image obtained is deconvoluted with an individual instrument profile, taking into consideration the optical transfer function (OTF) that is intrinsic to the instrument or the point spread function (PSF) that is intrinsic to the instrument. The result of this deconvolution is that the unsharp image points stemming from the imaging system employed are removed from each plane image, in other words, these image points can be calculated out.

Figure 4:
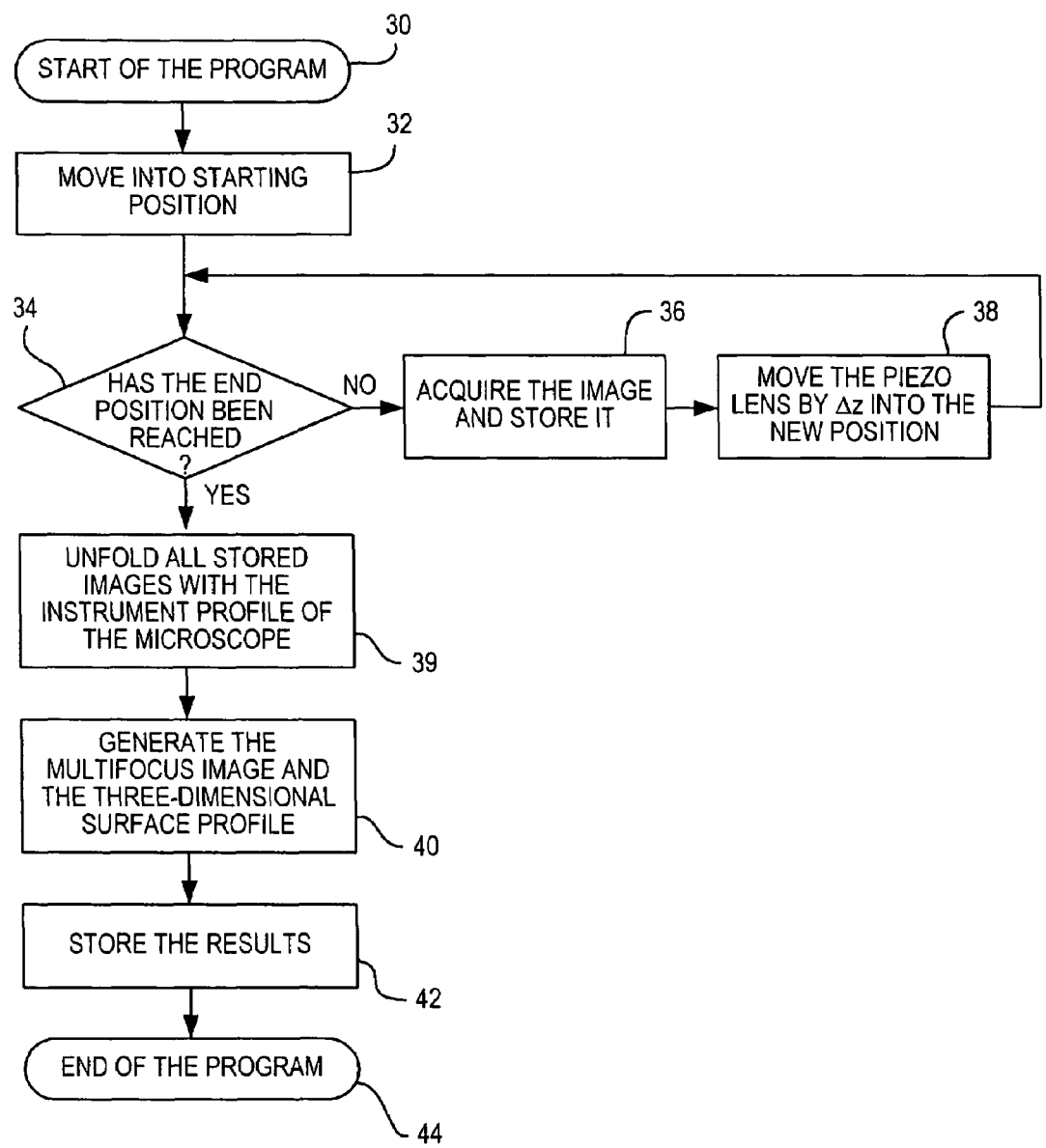
FIG. 4 a process sequence of another improved method for examining an object with a piezo-controlled lens.

FIG. 4 shows the process sequence of a method for examining an object with a piezo-controlled lens and encompassing an additional step to even further improve the image quality. As soon as it has been determined in step 34 that the end position has been reached, in the additional step 39, each of the stored individual images is deconvoluted with the appertaining instrument function. The deconvolution of each individual image with a subsequent multifocus image generation leads to a more precise multifocus image since, as result of the deconvolution, the unsharpnesses associated with the lens system are already eliminated in each individual image so that the overall image, which constitutes a superimposition of the individual images, no longer has such unsharpnesses.

Therefore, the methods depicted in FIGS. 2 and 4 differ from each other in terms of the sharpness and precision of the determined multifocus image. Here, it should be taken into account that the increased precision calls for more complex computations in each case. Consequently, the generation of the multifocus image requires more time. Thus, users can afforded various options among which they can choose at will. If it suffices for them to have a less sharp image, they can elect to proceed according to the method described in FIG. 2 so as to very quickly obtain an image of the object to be examined. When a higher degree of precision is called for, the process sequence according to FIG. 3 is an option, although it entails more complex computations and thus takes more time to generate the multifocus image. Extremely precise and sharp images can be obtained by means of the method depicted in FIG. 4. However, since in this case, it is necessary to deconvolute each of the recorded individual images, the computation and time requirements are greatest here.

As an alternative, the method depicted in FIG. 4 can also be carried out in such a way that the recorded image is already deconvoluted immediately prior to being stored, that is to say, as part of step 36, and it is only stored after the deconvolution procedure has been completed.

Figure 5:
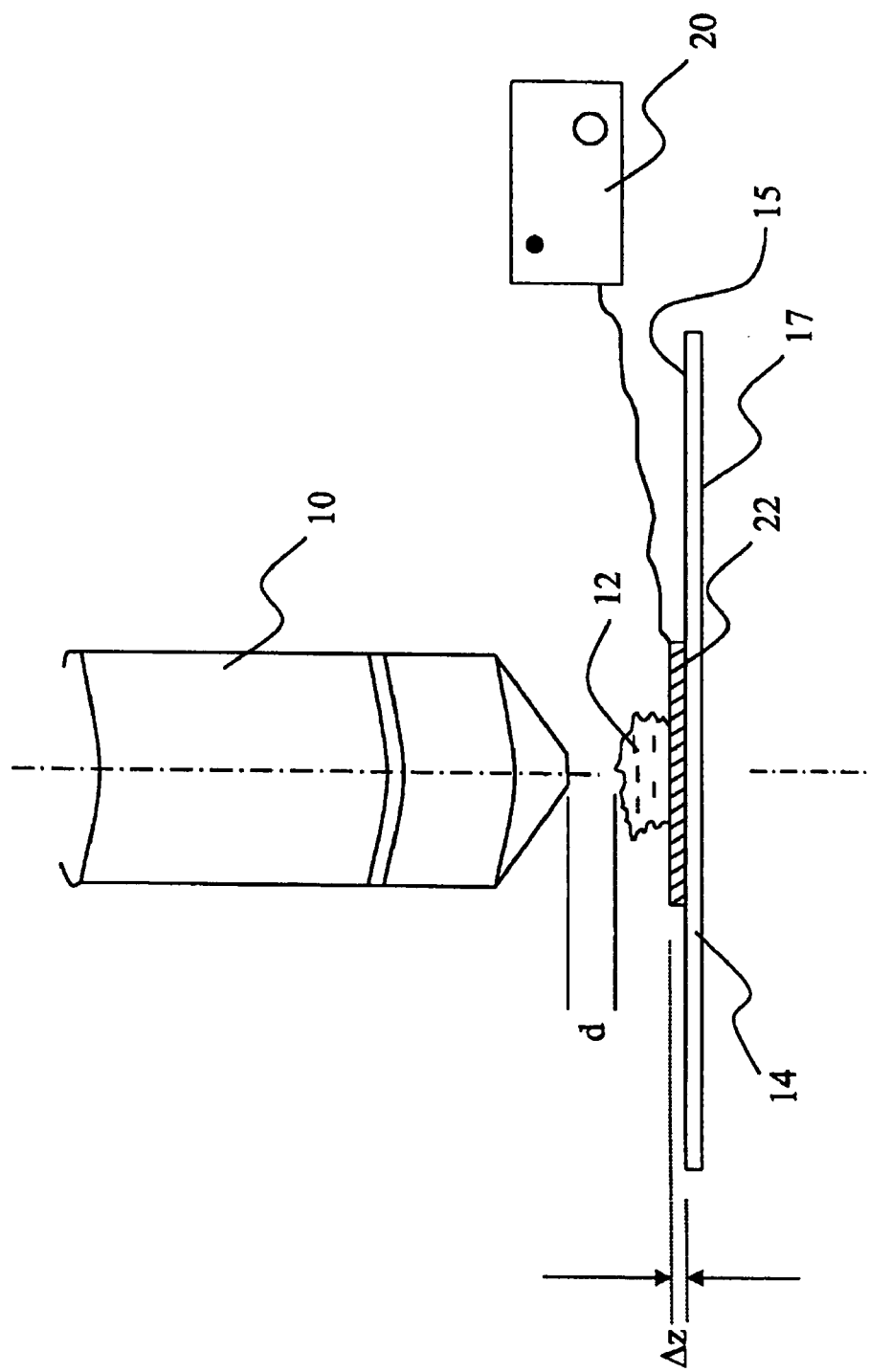
FIG. 5 a section of a device for examining an object with a piezo-controlled object stage.

FIG. 5 shows another embodiment of the invention. It is a schematic representation of a section of a device for examining an object 12 with a piezo-controlled object stage 14.

The lens 10 serves to examine the object 12 that has been placed onto the object stage 14. In order to position the focus of the lens 10 in the specimen 12, the distance d between the lens and the object is now adjusted in that the object stage has a piezo actuator 22 that is linked to a control device 20. This object stage piezo actuator 22 can be mounted on the side facing the lens on the surface 15 of the stage 14 or else on the surface 17 of the stage 14 facing away from the lens. However, mounting the piezo actuator 22 on the surface 15 of the stage 14 facing the lens 12 is already advantageous because here, lower weights need to be moved in order to generate the z movement. The object stage piezo actuator 22 can be actuated by means of the control device 20 so as to move the object 10 that has been placed on the piezo actuator 22 on the object stage 14 in the z direction by $\Delta z$. This movement is indicated by the double arrow. Thus, the focus within the object 12 can be adjusted by means of the piezo-controlled object stage 14.

Once an individual image has been recorded in every desired z plane, the series of individual images is, in turn, ready for further image processing.

Figure 6:
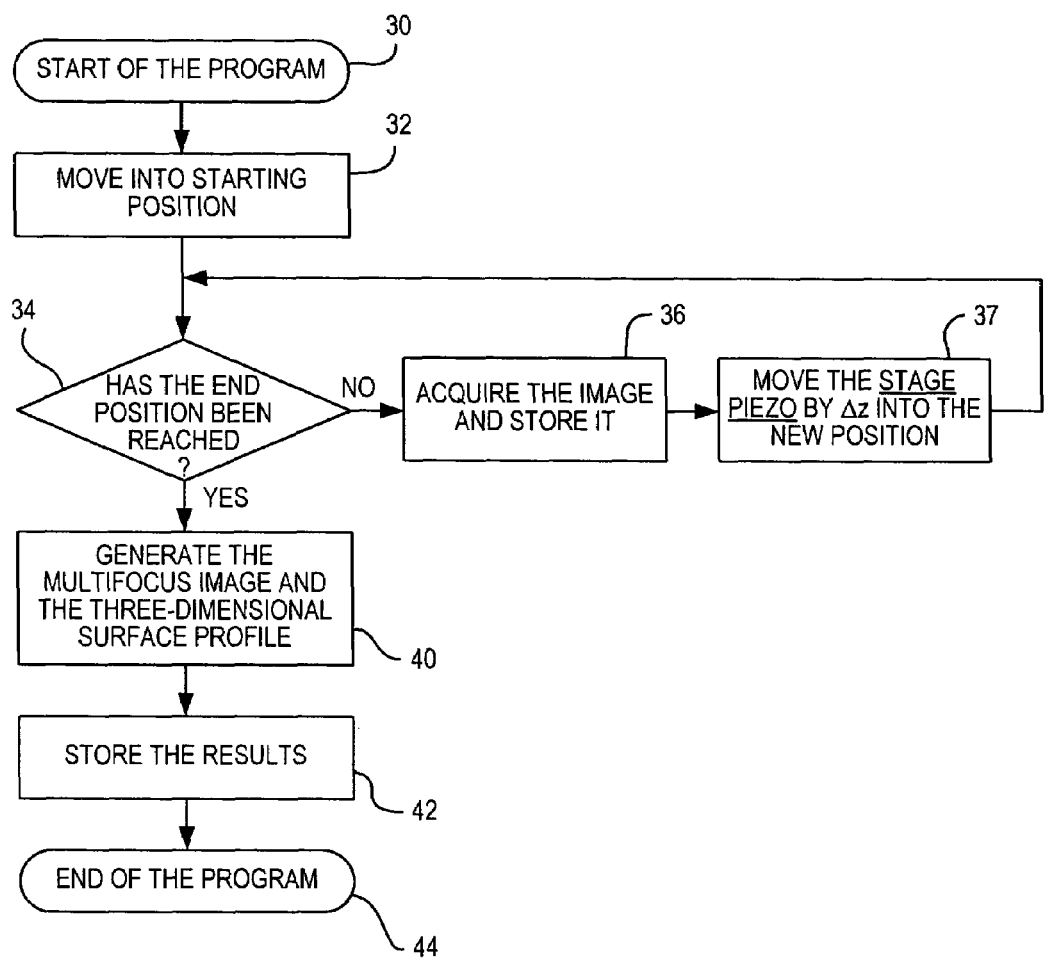
FIG. 6 a schematic depiction of the process sequence for examining an object with a piezo-controlled object stage.

FIG. 6 now shows a schematic depiction of the process sequence for examining an object with a piezo-controlled object stage, whereby the method is preferably realized employing software control. This method essentially corresponds to the method already depicted in FIG. 2. However, the focal plane of the lens in this method is adjusted by means of process step 37 in which the piezo control 19 is actuated in such a way that a thickness change by an amount $\Delta z$ is achieved in the z direction of the piezo actuator 22. Since the object 12 is placed onto the piezo actuator 22, the focal plane can be moved in the object.

Figure 7:
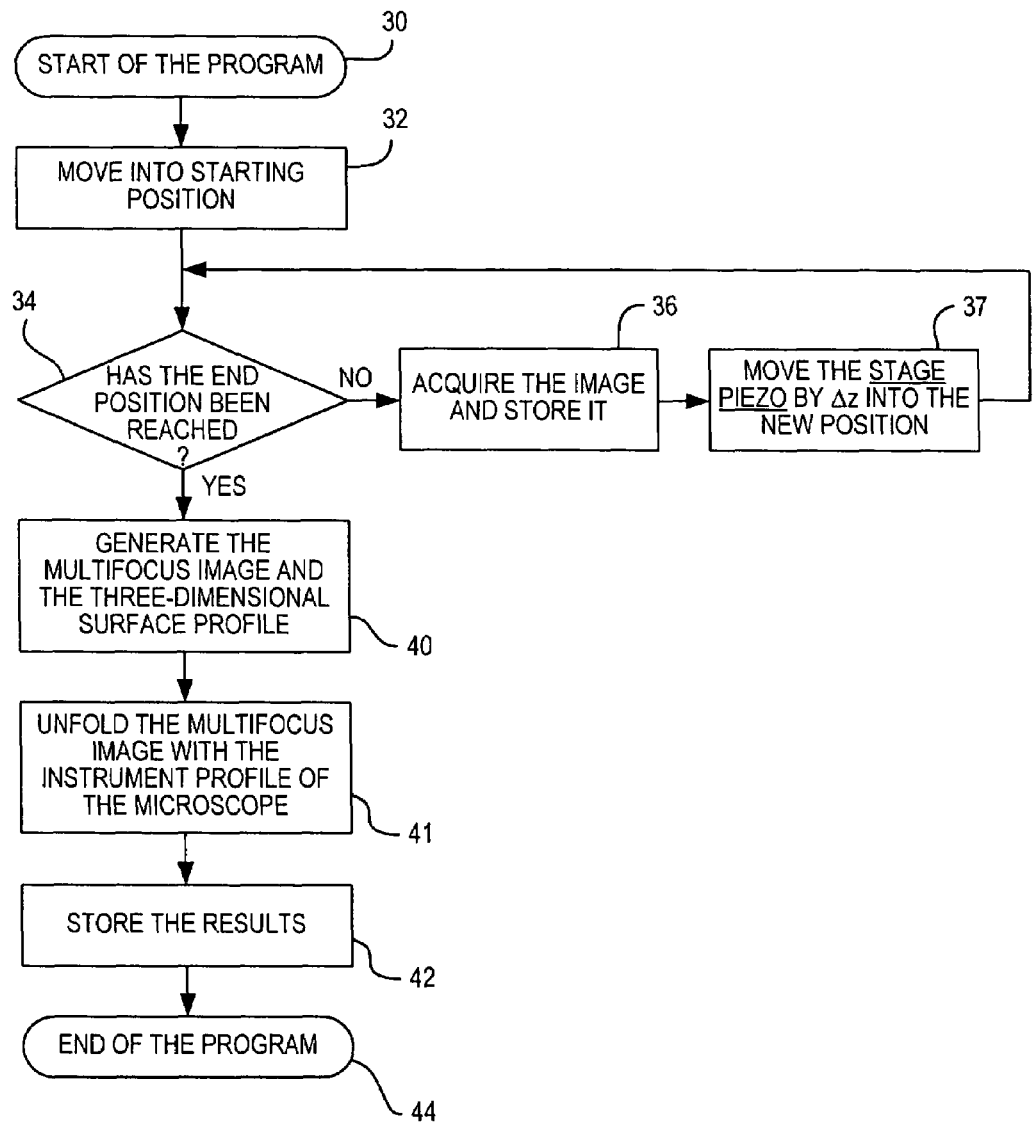
FIG. 7 a process sequence of an improved method for examining an object with a piezo-controlled object stage.

The use of an object stage piezo actuator 22 to adjust the distance between the lens and the specimen also translates into an improvement in the image quality. For this purpose, according to the method described in FIG. 3, by additionally inserting step 41, the multifocus image is deconvoluted with the instrument function. This method is depicted in FIG. 7.

Figure 8:
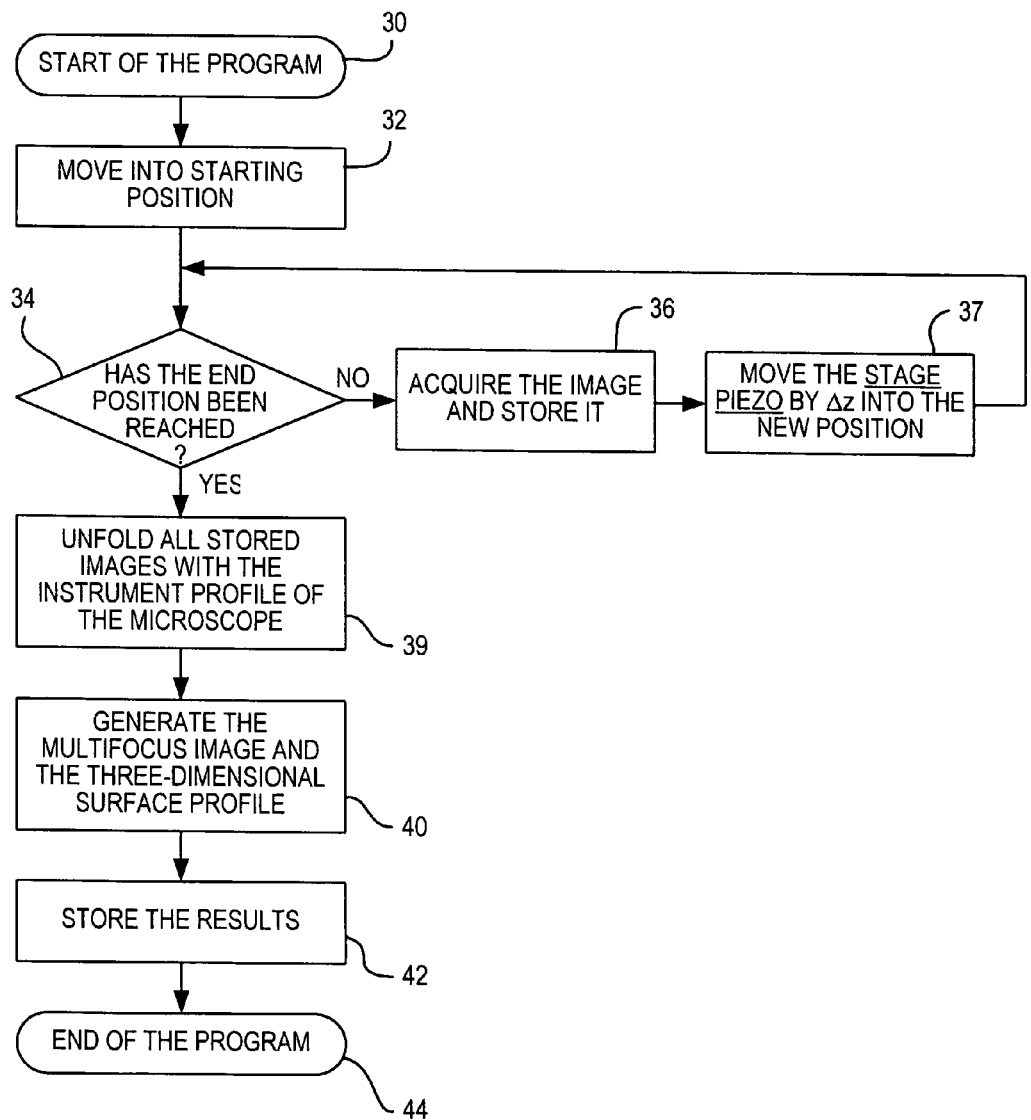
FIG. 8 a process sequence of another improved method for examining an object with a piezo-controlled object stage.

FIG. 8 shows another improvement by deconvoluting the individual images in step 39, which can be employed with the above-mentioned advantages in accordance with the method of FIG. 4, also when an object stage piezo actuator is used.

Figure 9:
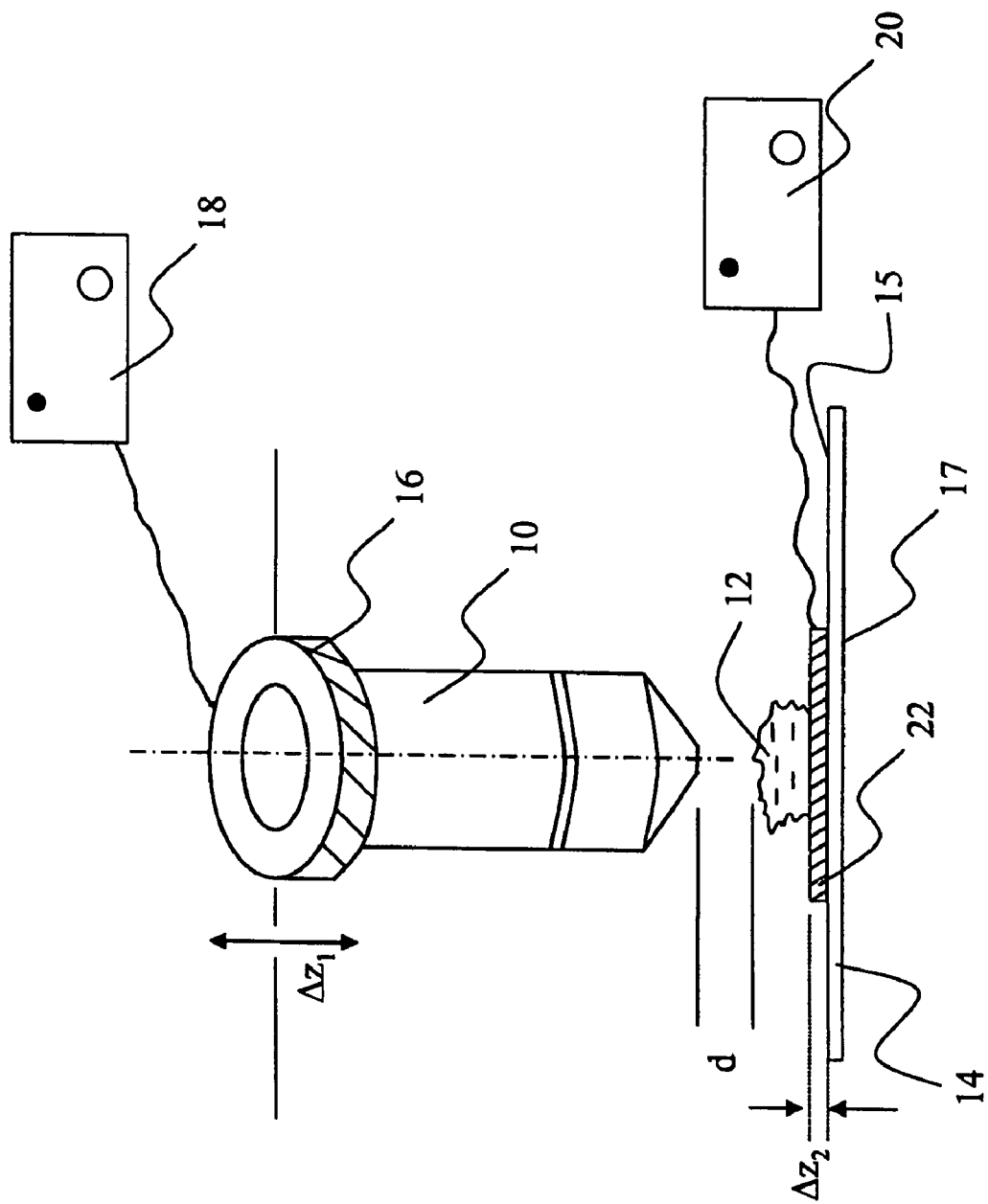
FIG. 9 a section of a device for examining an object with a piezo-controlled object stage and a piezo-controlled lens.

FIG. 9 shows another embodiment of the invention. It is a schematic representation of a section of a device for examining an object 12 with a piezo-controlled object stage 14 and with a piezo-controlled lens 10. In this embodiment of the invention, the lens 10 has a lens piezo actuator 16 that is connected to the control device 18. Furthermore, the object stage 14 has an object stage piezo actuator 22 that can be actuated by means of a control device 20. As already describe in conjunction with FIG. 5, the object stage piezo actuator can be mounted on the side of the surface 15 of the stage 14 facing the lens or else on the surface 17 of the stage 14 facing away from the lens. Owing to the normally small maximum regulating distances that can be achieved with the piezo actuators, this embodiment offers the possibility of scanning a considerably larger z area of the object 12 at a very high resolution since the lens piezo actuator 16 can be moved by an amount $\Delta z_1$ and the object stage piezo actuator 22 can be moved by an amount $\Delta z_2$.

Figure 10:
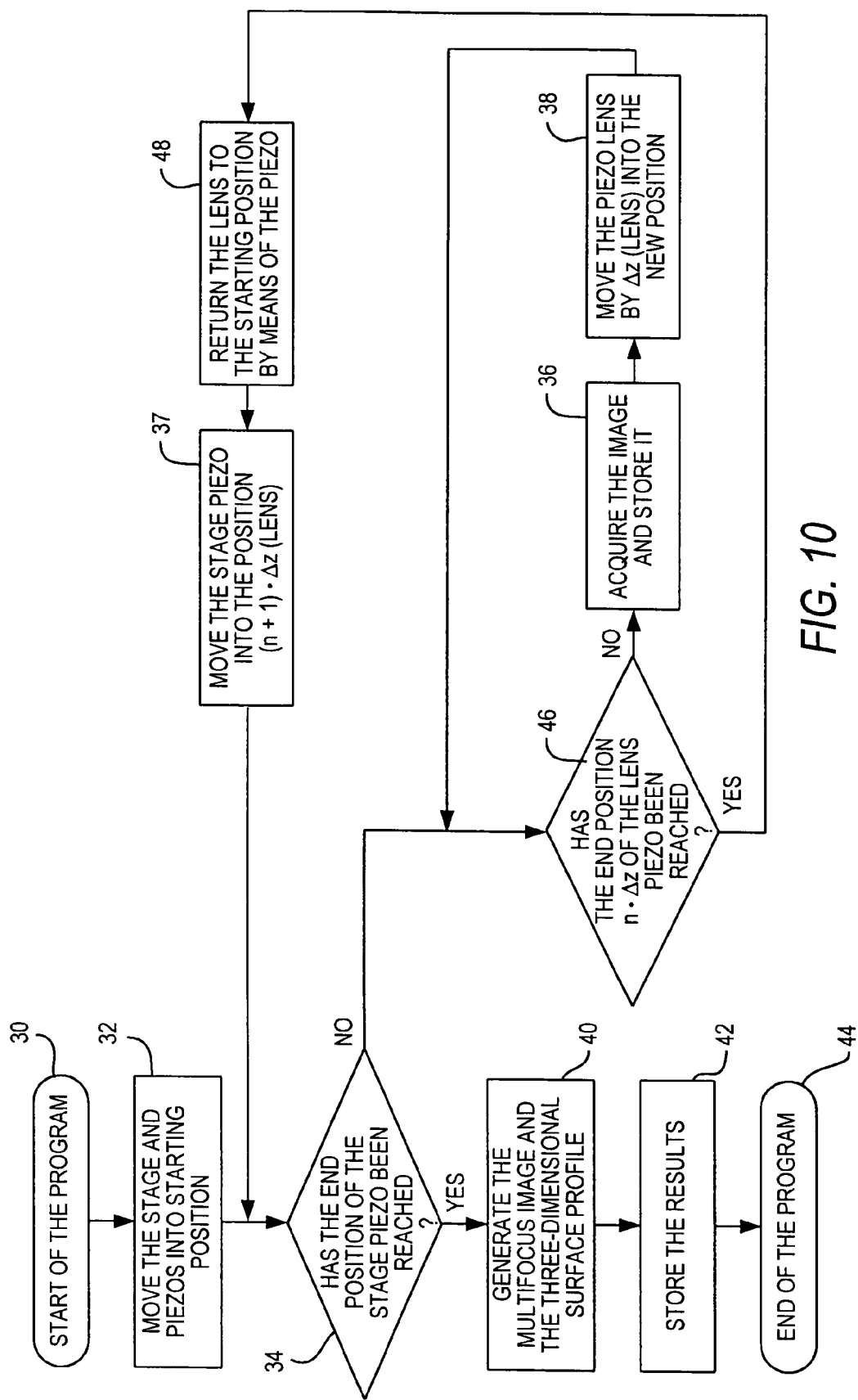
FIG. 10 a schematic depiction of the process sequence for examining an object with a piezo-controlled object stage and with a piezo-controlled lens.

These two piezo actuators make it possible to realize numerous modalities of the method, one of which is shown by way of an example in FIG. 10. Following a coarse pre-adjustment of the distance between the lens and the object, the further operating sequence of the device can take place automatically. For this purpose, after the start 30 of the method, in step 32, the lens 10 is moved into the starting position by means of the lens piezo actuator and the lens piezo actuator is also moved into the starting position. Subsequently, in step 34, a checking procedure ascertains whether the end position of the stage piezo entered by the user or else determined automatically has already been reached. If this is not the case, then, in step 46, a checking procedure ascertains whether the end position of the lens piezo actuator entered or computed by the user has been reached. If it is determined in step 46 that the end position of the lens piezo actuator has not yet been reached, then in step 36, an analog or digital camera, preferably a CCD camera, is employed to record the image of this focal plane. Subsequently, in step 38, the control device 18 is utilized to actuate the lens piezo actuator 16 in such a way that the lens 10 is moved so that, in the object 12, the next z plane in such an image is to be recorded lies in the focus of the lens 10. This loop is repeated until, in step 34, it is determined that the end position of the stage has been reached. Accordingly, in this control loop, the lens is controlled by the lens piezo actuator in n increments, each with a increment width of $\Delta z_1$ at various distances from the object. Once the lens has reached its end position, it has traversed a total distance of $n \cdot \Delta z_1 = N$.

If it is determined in step 46 that the end position of the lens has been reached, then in step 48, the lens is returned to its starting position by means of the lens piezo actuator, after which the object stage piezo actuator is actuated by the control device 20 in such a way that it is moved by the value of the preceding total lens excursion, namely, $\Delta z_2 = N + \Delta z_1$. Now the control loop of the lens is repeated and the lens is moved once again in increments over a total distance of $n \cdot \Delta z_1 = N$. Once its maximum excursion position has been reached, the lens once again returns to its starting position and the stage is moved by the object stage piezo actuator by the distance of the most recent total lens movement, namely, $\Delta z_2 = N + \Delta z_1$ (relative to the current stage position).

By repeating this control sequence consisting of "lens movement—stage movement", a large area of the specimen can be examined in spite of the small maximum regulating distance of the piezo.

As soon as it is recognized that the lens stage has also reached its end position, then, in step 40, a multifocus image is generated from the individual images thus acquired and subsequently a three-dimensional surface profile is created. In step 42, this image is stored and the method ends with step 44.

The described modality of the method can be better understood by way of an example on the basis of the data comprised in the table below for a lens and stage control sequence for n (lens)=3 and m (stage)=3.

| Lens piezo movement | Stage piezo movement (absolute) | Total movement | n | m | Action |
|---|---|---|---|---|---|
| 0 | 0 | $0 \cdot \Delta z_1$ | 0 | 0 | imaging |
| $\Delta z_1$ | 0 | $1 \cdot \Delta z_1$ | 1 | 0 | imaging |
| $\Delta z_1$ | 0 | $2 \cdot \Delta z_1$ | 2 | 0 | imaging |
| $\Delta z_1$ | 0 | $3 \cdot \Delta z_1$ | 3 | 0 | imaging |
| $-3 \cdot \Delta z_1$ | $-\Delta z_2 = 3 \cdot \Delta z_1 + \Delta z_1 = 4 \cdot \Delta z_1$ | $4 \cdot \Delta z_1$ | 0 | 1 | imaging |
| $\Delta z_1$ | 0 | $5 \cdot \Delta z_1$ | 1 | 1 | imaging |
| $\Delta z_1$ | 0 | $6 \cdot \Delta z_1$ | 2 | 1 | imaging |
| $\Delta z_1$ | 0 | $7 \cdot \Delta z_1$ | 3 | 1 | imaging |
| $-3 \cdot \Delta z_1$ | $-\Delta z_2 = 7 \cdot \Delta z_1 + \Delta z_1 = 8 \cdot \Delta z_1$ | $8 \cdot \Delta z_1$ | 0 | 2 | imaging |
| $\Delta z_1$ | 0 | $9 \cdot \Delta z_1$ | 1 | 2 | imaging |
| $\Delta z_1$ | 0 | $10 \cdot \Delta z_1$ | 2 | 2 | imaging |
| $\Delta z_1$ | 0 | $11 \cdot \Delta z_1$ | 3 | 2 | imaging |
| $-3 \cdot \Delta z_1$ | $-\Delta z_2 = 11 \cdot \Delta z_1 + \Delta z_1 = 12 \cdot \Delta z_1$ | $12 \cdot \Delta z_1$ | 0 | 3 | imaging |
| $\Delta z_1$ | 0 | $13 \cdot \Delta z_1$ | 1 | 3 | imaging |
| $\Delta z_1$ | 0 | $14 \cdot \Delta z_1$ | 2 | 3 | imaging |
| $\Delta z_1$ | 0 | $15 \cdot \Delta z_1$ | 3 | 3 | imaging |

As can be sen, by systemically alternating the movement sequence of lens 10 and the stage 14 by means of a piezo-controlled adjustment unit on the lens and on the stage, a considerably larger scanning area at a high resolution can be covered.

Altogether, the result is a total distance that can be traversed with two piezos (one on the lens and one on the object (stage)), namely, $$\Delta z(\text{total}) = \Delta z_1 \cdot (m+1) \cdot (n+1) \cdot \Delta z_1 [\mu m]$$

wherein m=number of increments of the stage/object piezo control system n=number of increments of the lens piezo system $\Delta z_1$=increment distance of the lens piezo (e.g. 0.5 μm)

Figure 11:
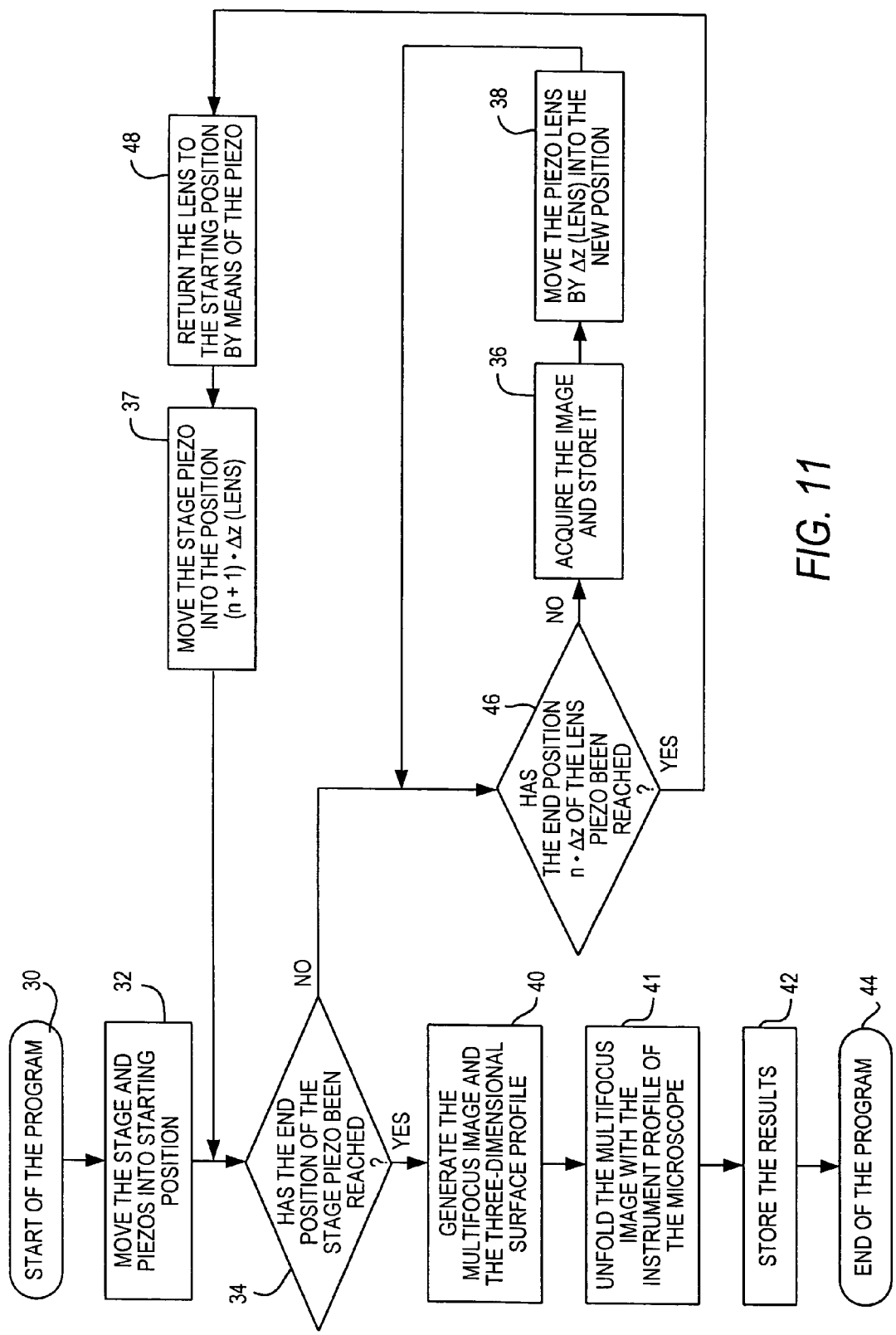
FIG. 11 a process sequence of an improved method for examining an object with a piezo-controlled object stage and a piezo-controlled lens.

The image quality can also be improved by using an object stage piezo actuator and a lens piezo actuator in order to adjust the distance between the lens and the specimen. For this purpose, according to the method described in FIG. 3, by additionally inserting step 41, the multifocus image is deconvoluted with the instrument function. This method is depicted in FIG. 11.

Figure 12:
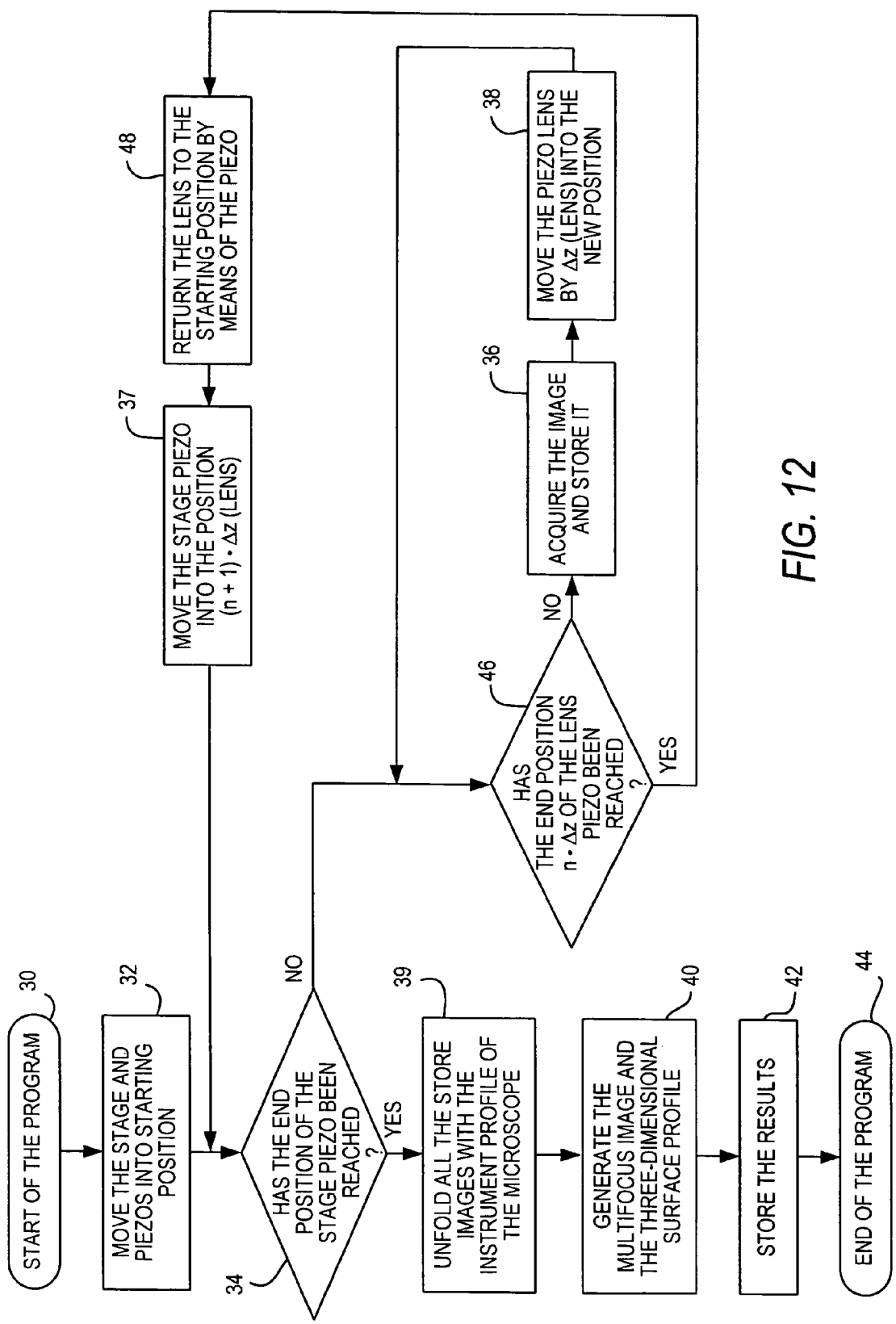
FIG. 12 a process sequence of another improved method for examining an object with a piezo-controlled object stage and a piezo-controlled lens.

FIG. 12 shows another improvement by deconvoluting the individual images in step 39, which can also be employed with the above-mentioned advantages in accordance with the method of FIG. 4, also when an object stage piezo actuator is used.

Figure 13:
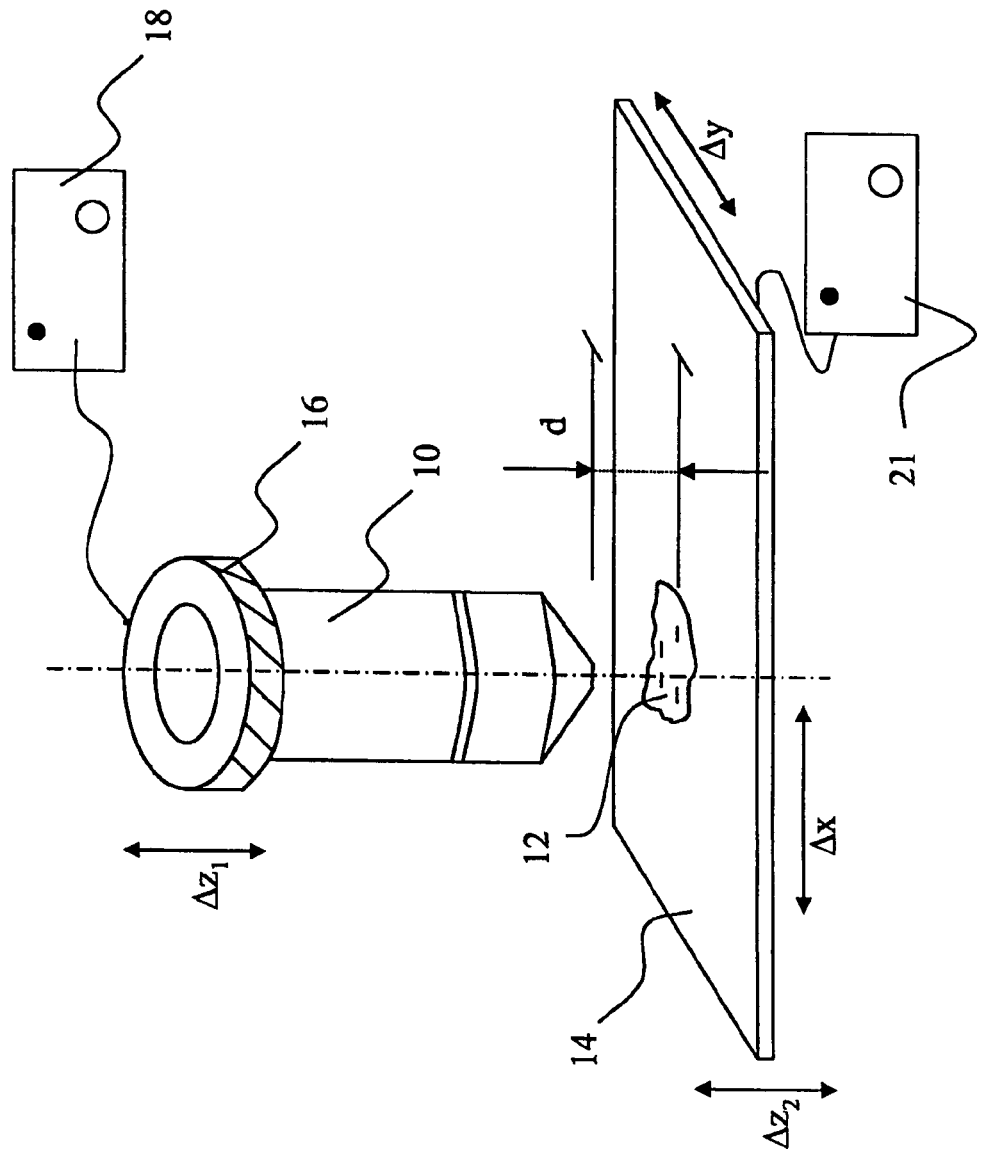
FIG. 13 a section of a device for examining an object with an electro-mechanically controlled object stage and with a piezo-controlled lens.

In another embodiment of the invention, FIG. 13 schematically shows a device for examining an object with a piezo-controlled lens in combination with an electro-mechanically controlled object stage. A lens 10 serves to examine an object 12 that has been placed onto an object stage 14. In order to be able to record the series of individual images, the lens 10 has a lens piezo actuator 16 that can be actuated by a control device 18. The object stage 14 can be moved in all three spatial directions in increments of $\Delta x$, $\Delta y$ and $\Delta z_2$ in each case, whereby this movement is regulated by a control module 21. The control module can preferably be connected to a computer. With this combination of movable components, even fairly large objects can now be examined since, thanks to the possibly of moving the stage in the x,y plane, a camera can be employed to record partial images in various x,y positions in one single z plane. Then, using image-processing software, these partial images can be combined once again to form a single plane image, the so-called image mosaic, which is several times larger in size than the otherwise achievable image-recording area. Moreover, with the stage 14, which can also be electro-mechanically moved in the z direction, the attainable scanning area is considerably expanded wince it is then possible to adjust focal planes stemming from a movement $\Delta z_2$ of the stage in the z direction and from a movement $\Delta z_1$ of the piezo-controlled lens.

Figure 14:
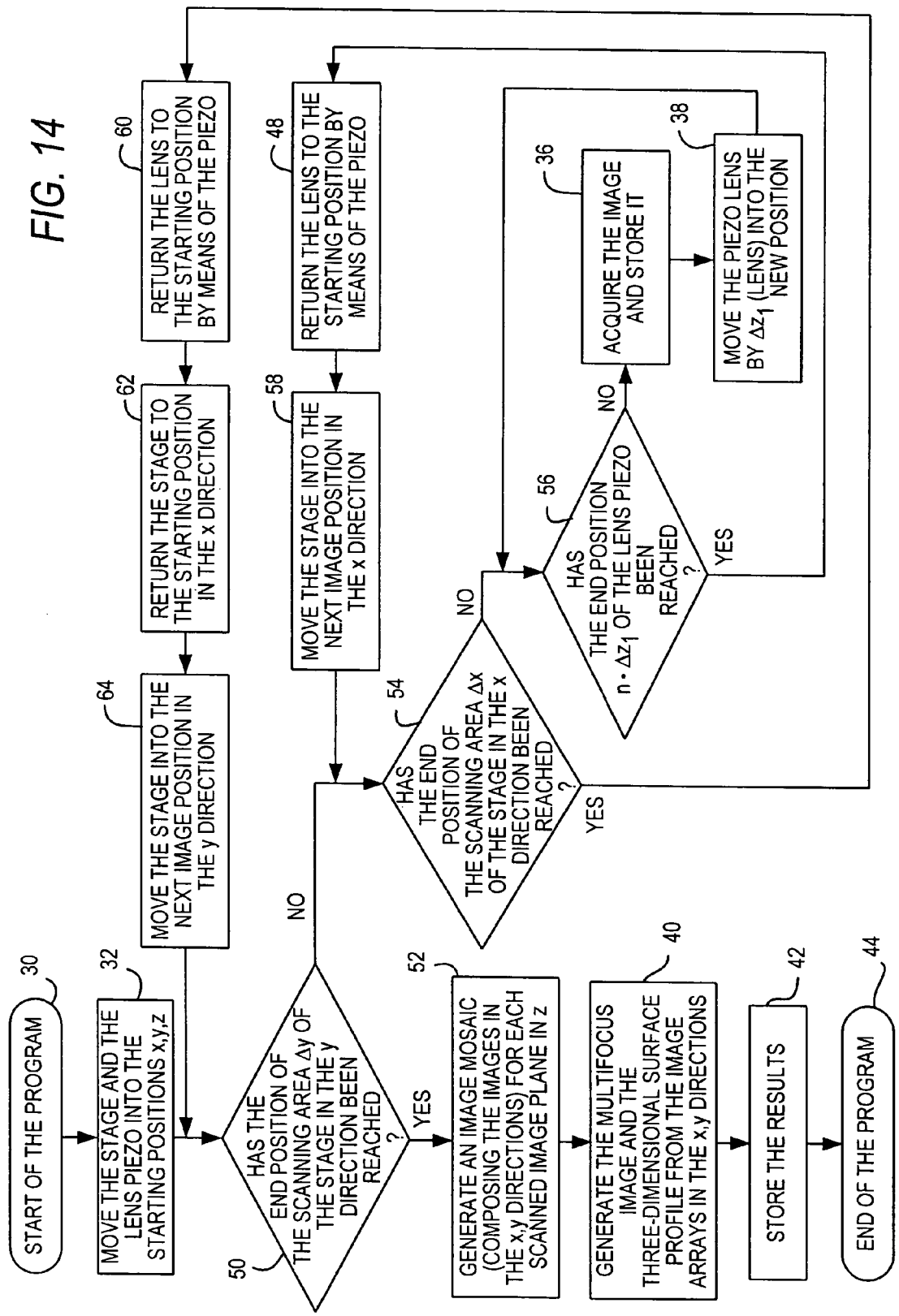
FIG. 14 a schematic depiction of the process sequence for examining an object with an electro-mechanically controlled object stage and with a piezo-controlled lens.

FIG. 14 makes use of a flow chart to show a schematic depiction of the process sequence for examining an object 10 with an electro-mechanically controlled object stage 14 and with a piezo-controlled lens 12. After the start 30 of the method and following a coarse pre-adjustment of the distance between the lens and the object, the further operating sequence of the device can take place, preferably fully automatically. For this purpose, first the object stage 14 and the lens are moved into the starting position. This is advantageously done by means of the piezo and stage control systems (18, 21) using a computer.

In three control loops, the satge 14 is then moved in increments along a defined x,y,z area. The first control loop is defined by the query 50 in which a checking procedure ascertains whether the stage 14 has reached the end position in the y direction. The second control loop is defined by the query 54 in which a checking procedure ascertains whether the stage 14 has reached the end position in the x direction. The third control loop is defined by the query 56 in which a checking procedure ascertains whether the lens has reached the end position. If the stage 14 is within x,y limits that have been entered manually or automatically, then the stage is moved further in increments by one image field at a time by means of the program loop. Like with a checkerboard pattern, a prescribed scanning area is traversed fieldwise in this manner.

In each newly accessed x,y position of the stage, an image stack is then recorded in the z direction.

This is achieved in the third control loop, in which, in step 36, the image is recorded and subsequently the new focal plane is changed by the movement of the lens 10 by the value $\Delta z_1$ in step 38. In step 36, the images are recorded by an analog or digital camera and then temporarily stored. In this manner, the focal plane passes through the object 12 in n increments and the desired image stack is recorded.

Once a focal image stack has been recorded, then, in step 48, the lens is returned to its z starting position. In step 58, the object stage is controlled so as to move by one image field in the x,y plane and an additional focal image stack is recorded with the piezo lens according to the above-mentioned method.

Once all of the images have been recorded and stored in this manner, then, in step 52, a mosaic image is created, preferably automatically, for each focal plane. This mosaic image is created by compiling the images recorded in one focal plane, in other words, the images that were recorded in one focal plane within a predefined x,y area. The mosaic images are created with known methods such as image-overlapping composition methods (autocorrelation) or touching composition methods. Since the mosaic images are generated for all of the focal planes, the result is a mosaic image stack that represent all of the images of the focal planes.

Due to the small excursions of the lens piezo actuator that are possible, very small distances can be attained between the individual focal planes. This property allows work to be carried out even with high-resolution lenses, that is to say, lenses having a small depth of focus, and to render very fine topographical details of a microscopic object visible.

In step 40, the combination of all of the image mosaics—in other words, many individual images in the x,y direction—results in a completely sharp image in the z direction as well as a high-resolution image in the x,y direction.

In the three-dimensional space, the resolution can be defined as so-called voxel resolution. A voxel is a volume element that has pixels in three spatial directions. At a voxel resolution of, for example, 1 µm edge length of an image pixel, the result is then a resolution of 25,400 dpi in x,y,z, which can be considered as "very high resolution" within the scope of this presentation.

Figure 15:
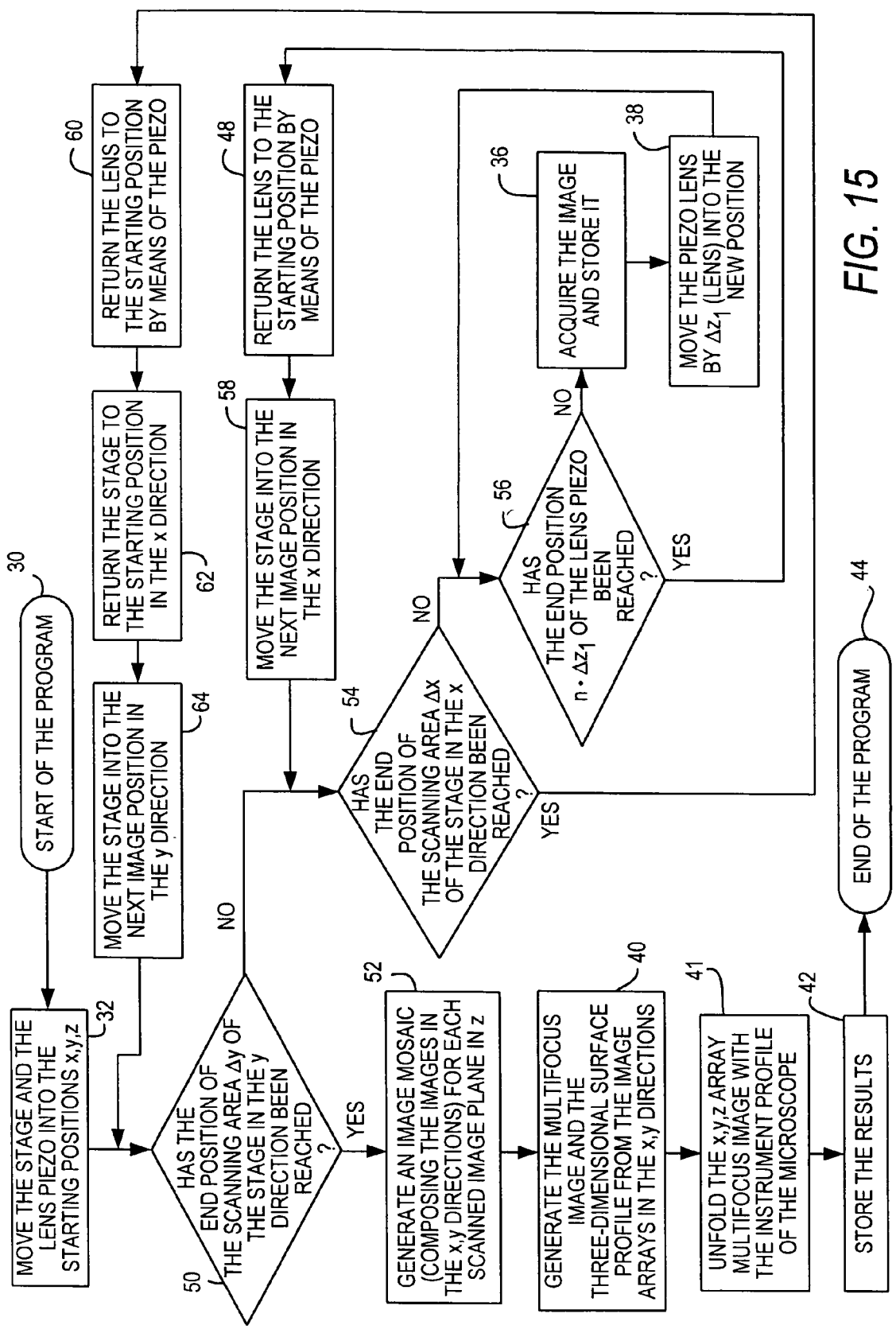
FIG. 15 a process sequence of an improved method for examining an object with an electro-mechanically controlled object stage and with a piezo-controlled lens.

As shown in FIG. 15, with this method as well, after the multifocus image has been generated, the multifocus image can be deconvoluted with the instrument profile of the recording system in step 41 for purposes of further improving the image sharpness in the z direction.

Figure 16:
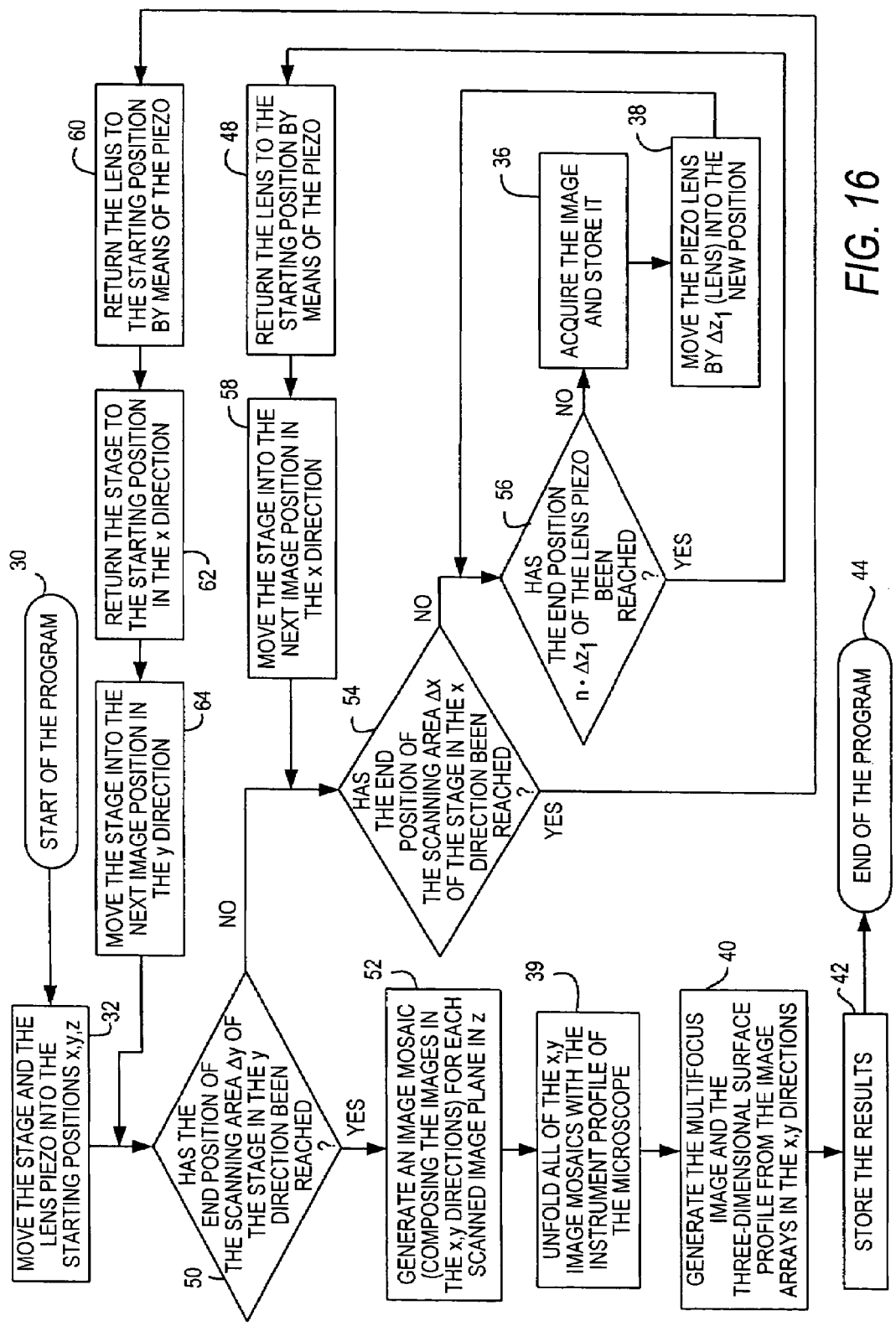
FIG. 16 a process sequence of another improved method for examining an object with an electro-mechanically controlled object stage and with a piezo-controlled lens.

It is likewise possible, as shown in FIG. 16, to deconvolute all of the x,y mosaic images with the instrument profile of the recording system in step 39 already before generating the multifocus image in step 40. As already mentioned, this method is more time-consuming but it translates into a further improved multifocus image in terms of the sharpness of the image.

Consequently, deconvoluting the individual mosaic images according to the method described in FIG. 16 with a subsequent generation of a multifocus image results in a more precise multifocus mosaic image. However, the complexity of the computations is considerable since each mosaic image of the stack has to be deconvoluted.

In contrast, deconvolution of the already created multifocus image according to the method described in FIG. 15 can be computed much more quickly on the basis of the original mosaic image data (mosaic images that have not been deconvoluted). The fastest computation is achieved by dispensing with a deconvolution of the original mosaic images as described in the method according to FIG. 14. The highest speed among all of the embodiments presented here is achieved by directly computing a multifocus image on the basis of the previously generated mosaic images. Users can freely select which variant of the method they should employ in order to obtain the envisaged results.

Figure 17:
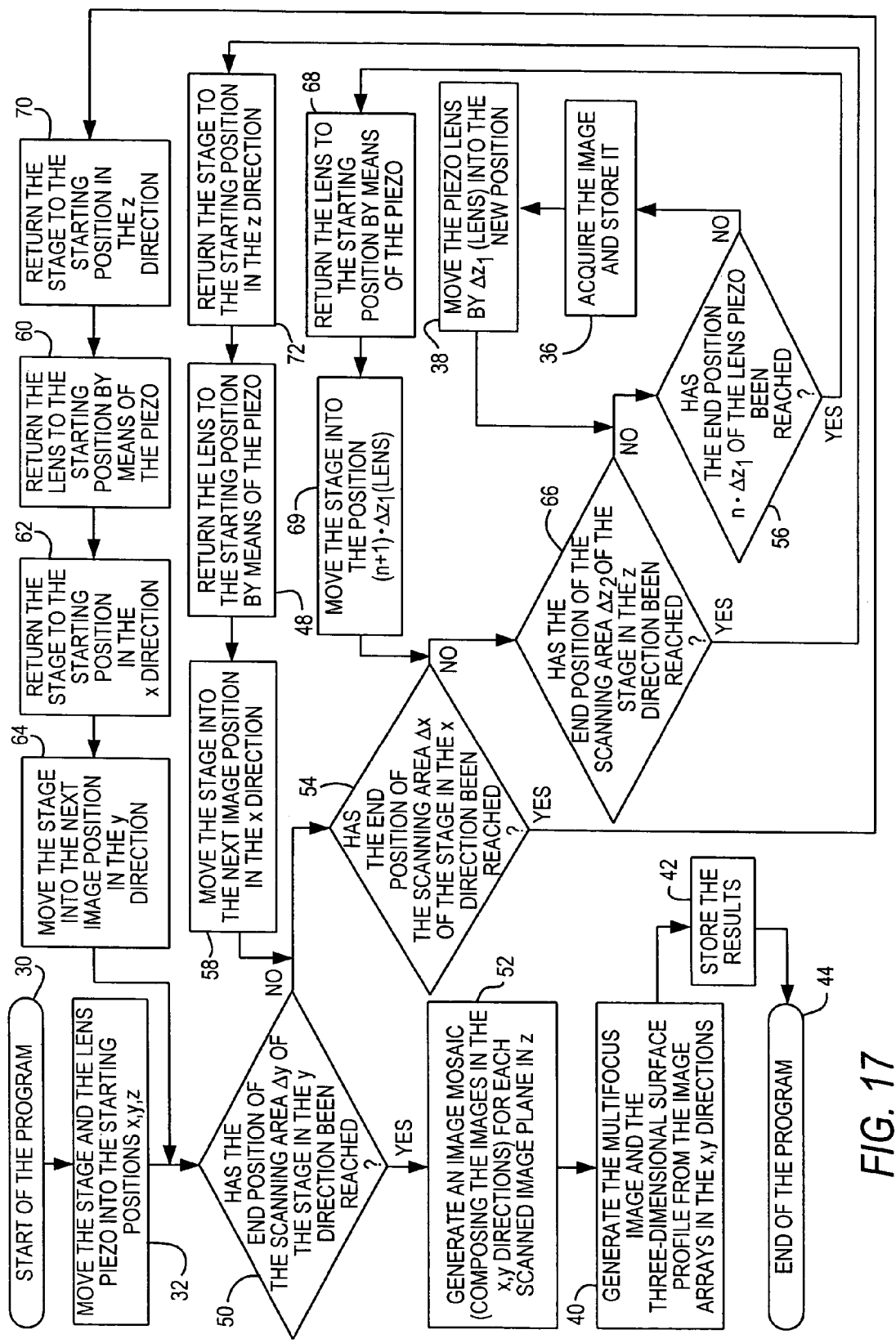
FIG. 17 a process sequence of another improved method for examining an object with an elector-mechanically controlled object stage and with a piezo-controlled lens.
Figure 18:
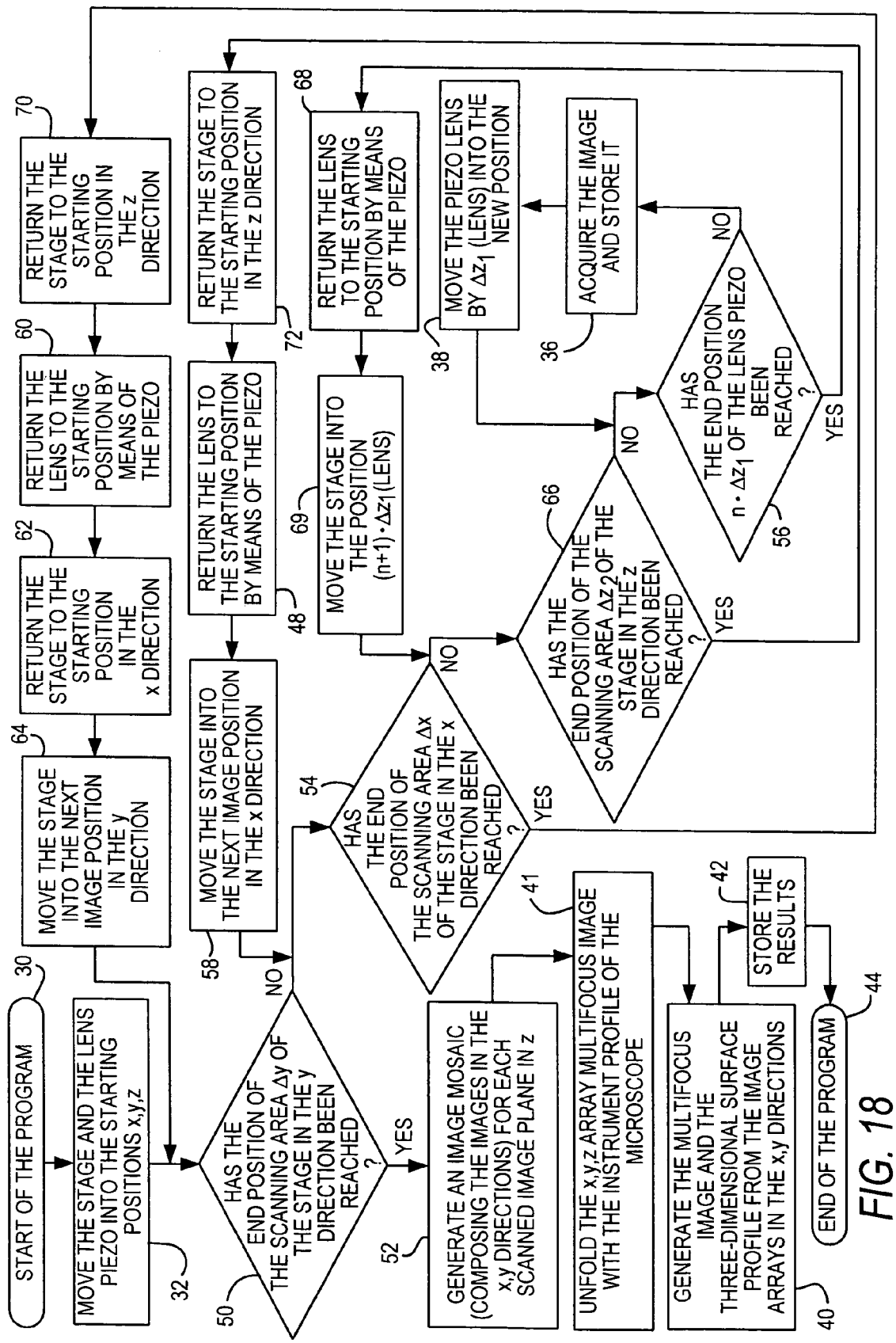
FIG. 18 a process sequence of another improved method for examining an object with an electro-mechanically controlled object stage and with a piezo-controlled lens.
Figure 19:
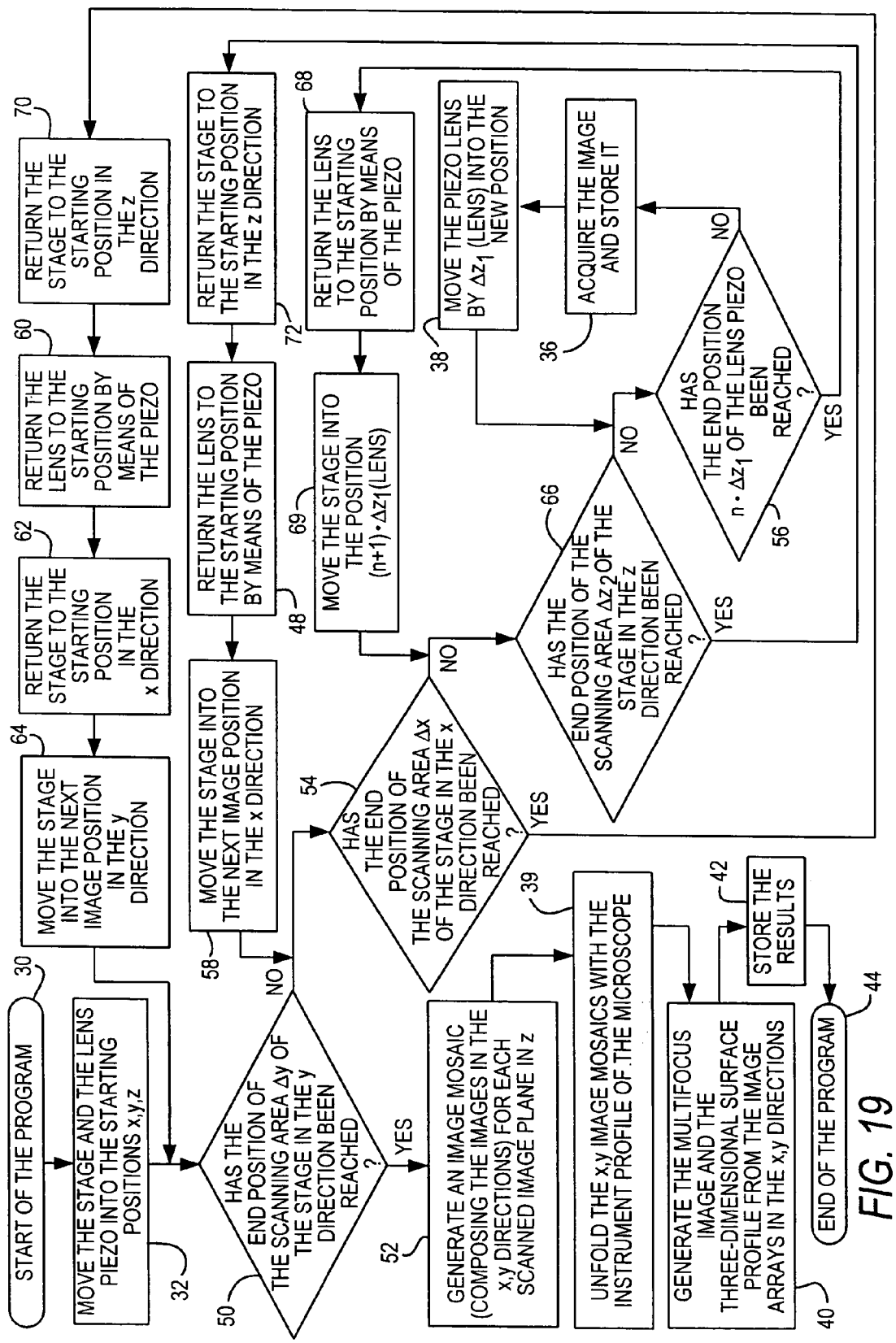
FIG. 19 a process sequence of another improved method for examining an object with an electro-mechanically controlled object stage and with a piezo-controlled lens.

By using the device described in FIG. 13 with an electro-mechanically adjustable stage 14, the resolution in the z direction can be increased even further. For this purpose, the distance between the lens 10 and the object 12 is adjusted on the basis of a suitable combination of the $\Delta z_1$ of the lens 10 and the $\Delta z_2$ of the stage 14. In FIGS. 17 to 19, this process sequence is shown for a method without deconvolution (FIG. 17), a method with deconvolution of the multifocus image (FIG. 18) and a method with deconvolution of the individual images (FIG. 19).

All of the methods are characterized in that, in step 66, a checking procedure additionally ascertains whether the end position of the scanning area $\Delta z_2$ of the stage 14 has been reached. Accordingly, the additional step 69 is then necessary in which the object stage 14 is moved into a new position. Moreover, the other loops require the return of the stage to its starting position, and this is done in steps 70 and 72. Therefore, with this variant of the method, an image with depth of focus and a three-dimensional surface profile of this image can be generated by concurrently employing a normal object stage in the x,y,z direction and a piezo-controlled lens in the z direction. In this fashion, a much larger z area can be scanned at the highest resolution in the z direction.

FIG. 17 schematically shows how the method works, on the basis of a process sequence. Following a coarse preadjustment of the distance between the lens 10 and the object 12, the further process steps can be carried out automatically. The object 10 and the electro-mechanically controllable object stage 14 are moved into a starting position by means of the piezo-control device 18 and the stage control system 21, preferably with a computer. In three control loops, which are defined by the query steps 50, 54 and 66, the stage 14 is now moved in increments over a defined x,y,z area. The first control loop is triggered by the query 50, and it checks the stage position in the x,y direction each time.

If the stage 14 is within x,y limits that have been entered manually or automatically, then the stage is moved further in increments by one image field at a time by means of the program loop. Like with a checkerboard pattern, a prescribed scanning area is traversed fieldwise in this manner. In each newly accessed x,y position of the stage, an image stack is then recorded in the z direction. This is carried out by the third control loop which, in step 56, checks whether the end position of the regulating distance of the lens piezo actuator has been reached. As long as this position has not yet been reached, in step 36, an image is recorded, stored and, in step 38, the position of the lens is changed with the lens piezo actuator by an amount $\Delta z_1$. This method can be depicted on the basis of the following example.

After the method has been started, in the control loop defined by step 56, the lens is regulated by the lens piezo actuator in $\Delta z_1$ increments at various distances from the object. Once the lens has reached its end position, it will have traversed a total distance of $n \cdot \Delta z_1 = N$. Then, in step 68, the lens piezo actuator returns the lens to its starting position. Moreover, the stage 14 is moved by the value of the preceding total lens excursion $-\Delta z_2 = N + \Delta z_1$.

Now, the control loop is repeated and the lens is once again moved in increments over a total distance of $n \cdot \Delta z_1 = N$. Once its maximum excursion position has been reached, the lens 10 once again returns to its starting position and the stage 14 is moved by the distance of the most recent total lens movement, namely, by $-\Delta z_2 = N + \Delta z_1$, relative to the current stage position.

By repeating this lens movement and stage movement, a considerably larger area of the object can be scanned at a very high resolution since piezos can execute very small movements. In each focal plane reached as a result of the lens movement $\Delta z_1$, an image is recorded with an analog or digital camera and subsequently stored (in the RAM, on the hard disk, etc.).

Concretely speaking, the result is a process sequence of the kind presented in the table below, for example, for the following lens and stage control sequence for n (lens)=3 and m (stage)=3.

| Lens piezo movement | Stage piezo movement (absolute) | Total movement | n | m | Action |
| --- | --- | --- | --- | --- | --- |
| 0 | 0 | $0 \cdot \Delta z_1$ | 0 | 0 | imaging |
| $\Delta z_1$ | 0 | $1 \cdot \Delta z_1$ | 1 | 0 | imaging |
| $\Delta z_1$ | 0 | $2 \cdot \Delta z_1$ | 2 | 0 | imaging |
| $\Delta z_1$ | 0 | $3 \cdot \Delta z_1$ | 3 | 0 | imaging |
| $-3 \cdot \Delta z_1$ | $-\Delta z_2 = 3 \cdot \Delta z_1 + \Delta z_1 = 4 \cdot \Delta z_1$ | $4 \cdot \Delta z_1$ | 0 | 1 | imaging |
| $\Delta z_1$ | 0 | $5 \cdot \Delta z_1$ | 1 | 1 | imaging |
| $\Delta z_1$ | 0 | $6 \cdot \Delta z_1$ | 2 | 1 | imaging |
| $\Delta z_1$ | 0 | $7 \cdot \Delta z_1$ | 3 | 1 | imaging |
| $-3 \cdot \Delta z_1$ | $-\Delta z_2 = 7 \cdot \Delta z_1 + \Delta z_1 = 8 \cdot \Delta z_1$ | $8 \cdot \Delta z_1$ | 0 | 2 | imaging |
| $\Delta z_1$ | 0 | $9 \cdot \Delta z_1$ | 1 | 2 | imaging |
| $\Delta z_1$ | 0 | $10 \cdot \Delta z_1$ | 2 | 2 | imaging |
| $\Delta z_1$ | 0 | $11 \cdot \Delta z_1$ | 3 | 2 | imaging |
| $-3 \cdot \Delta z_1$ | $-\Delta z_2 = 11 \cdot \Delta z_1 + \Delta z_1 = 12 \cdot \Delta z_1$ | $12 \cdot \Delta z_1$ | 0 | 3 | imaging |
| $\Delta z_1$ | 0 | $13 \cdot \Delta z_1$ | 1 | 3 | imaging |
| $\Delta z_1$ | 0 | $14 \cdot \Delta z_1$ | 2 | 3 | imaging |
| $\Delta z_1$ | 0 | $15 \cdot \Delta z_1$ | 3 | 3 | imaging |

As can be seen, by systematically alternating the movement sequence of the lens 10 and the stage 14 by means of a piezo-controlled adjustment unit 16, 18 on the lens and the position control 21 of the stage 14, a considerably larger scanning area can be covered at a high resolution. This results in the following total distance that can be traversed by means of this method:

$$\Delta z(\text{total}) = \Delta z_1 \cdot (m+1) \cdot (n+1) \cdot \Delta z_1 [\mu m]$$

wherein
m=number of increment of the stage/object control system (electro-mechanically
n=number of increments of the lens piezo system
$\Delta z_1$=increments distance of the lens piezo (e.g. 1 μm)

Once a focus image stack has been recorded on the basis of the above-mentioned interaction between the stage movement and the lens movement, the piezo lens 10 returns in increments to its z staring position. The stage 14 is moved further by one image field in the x,y plane and an additional focal image stack is recorded with the piezo lens according to the above-mentioned method.

Once all of the images have been scanned in, then, in step 52, the mosaic image is generated for each scanned z plane, whereby this step is preferably first carried out automatically by a special program. In this manner, a mosaic image is created for each focal plane. Then, in step 40, a multifocus image is once again created.

In order to improve the image quality, as shown in FIG. 18, once again after generating the multifocus image, with this method as well, the multifocus image can be deconvoluted with the instrument profile of the recording system in step 41 in order to further improve the image sharpness in the z direction.

It is likewise possible, as shown in FIG. 19, to deconvolute all of the x,y mosaic images with the instrument profile of the recording system already in step 39 before generating the multifocus image in step 40. As already mentioned, this method is more time-consuming but it translates into an improved multifocus image in terms of the sharpness of the image.

Figure 20:
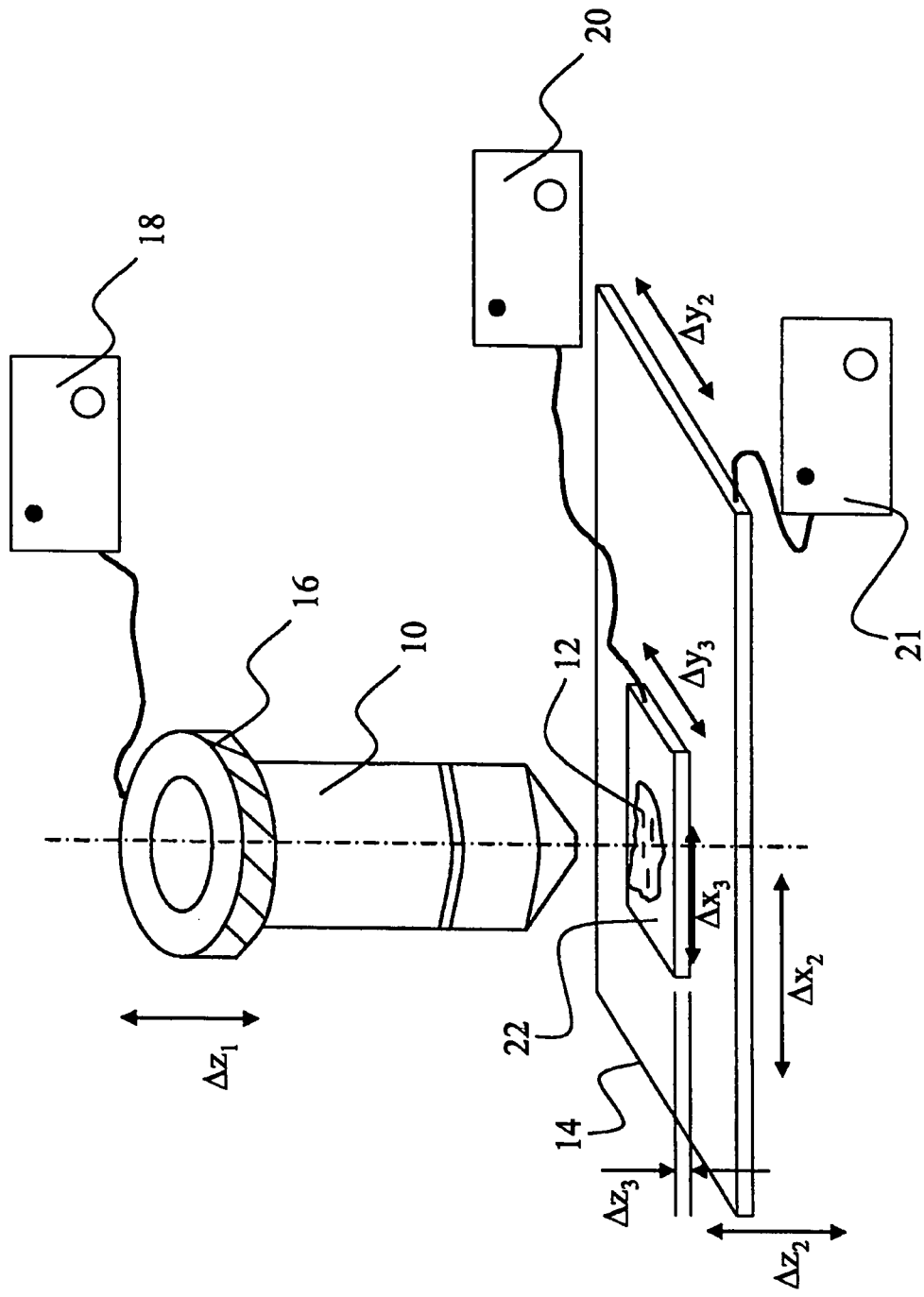
FIG. 20 a section of a device for examining an object with a piezo-controlled and an electro-mechanically controlled object stage and with a piezo-controlled lens.

In another embodiment of the invention, a piezo actuator 16 with an appertaining control device 18 is arranged on the lens 10 and a piezo actuator 22 with an appertaining control device 20 is arranged on the stage 14. Moreover, the stage 14 is coupled to an electro-mechanical control device in order to effectuate the movement of the object stage in the x, y and z directions. In a schematic depiction, this configuration is shown in FIG. 20.

Thus, the following three adjustment members are present for adjusting the distance between the lens 10 and the object 12, in other words, for the total possible z movement:
1. electro-mechanical stage: $\Delta z_2$
2. stage piezo actuator: $\Delta z_3$
3. lens piezo actuator: $\Delta z_1$ Two adjustment members are present for the movement of the object stage in the x direction and y direction:
1. electro-mechanical stage: $\Delta x_2$; $\Delta y_2$
2. stage piezo actuator: $\Delta x_3$; $\Delta y_3$ Through the possibilities of the piezo combination, a fine scanning area can be implemented which is defined by the adjustment area covered by both piezo actuators.

Figure 21:
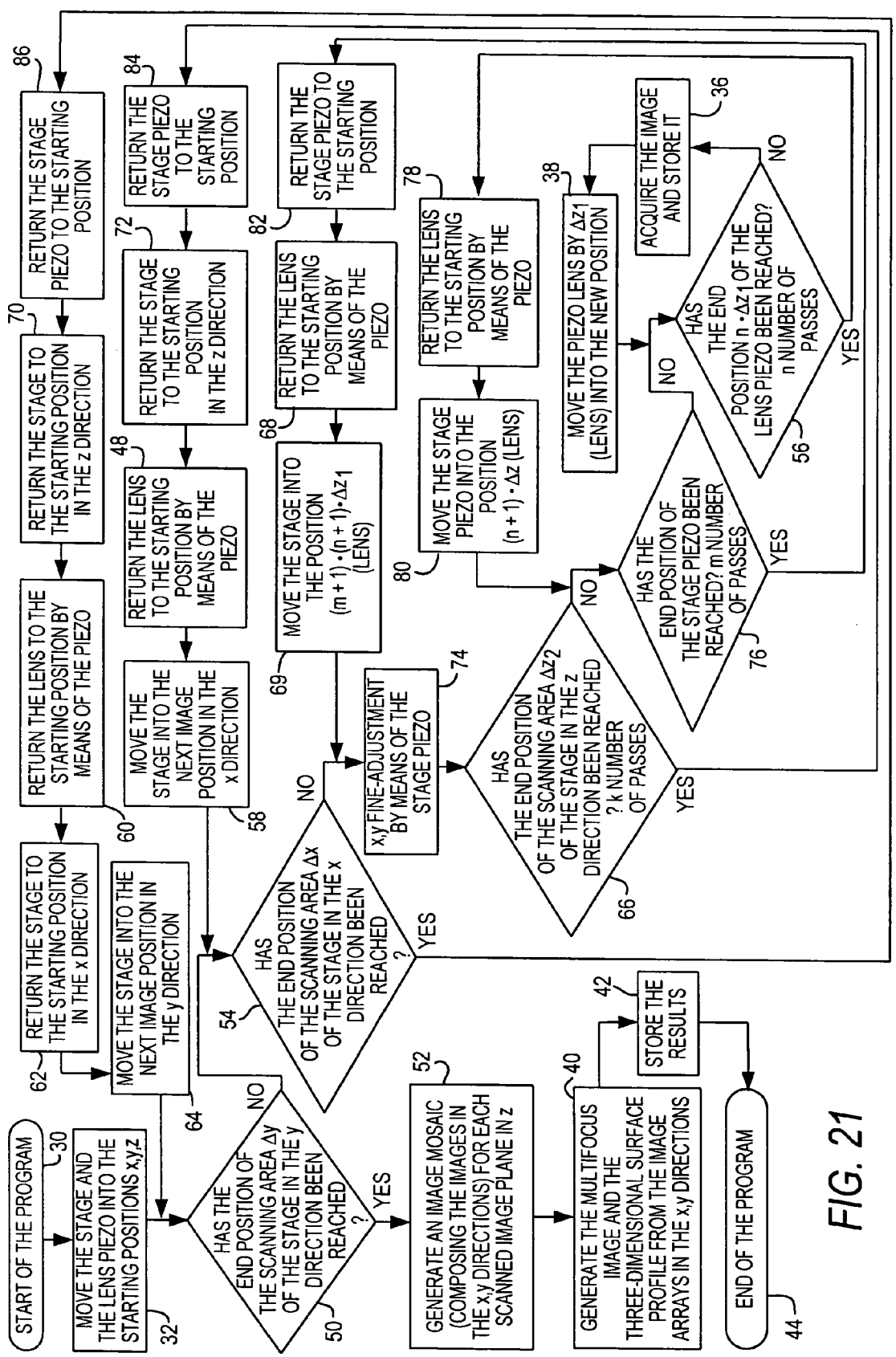
FIG. 21 a schematic depiction of the process sequence for examining an object with a piezo-controlled and electro-mechanically controlled object stage and with a piezo-controlled lens.
Figure 22:
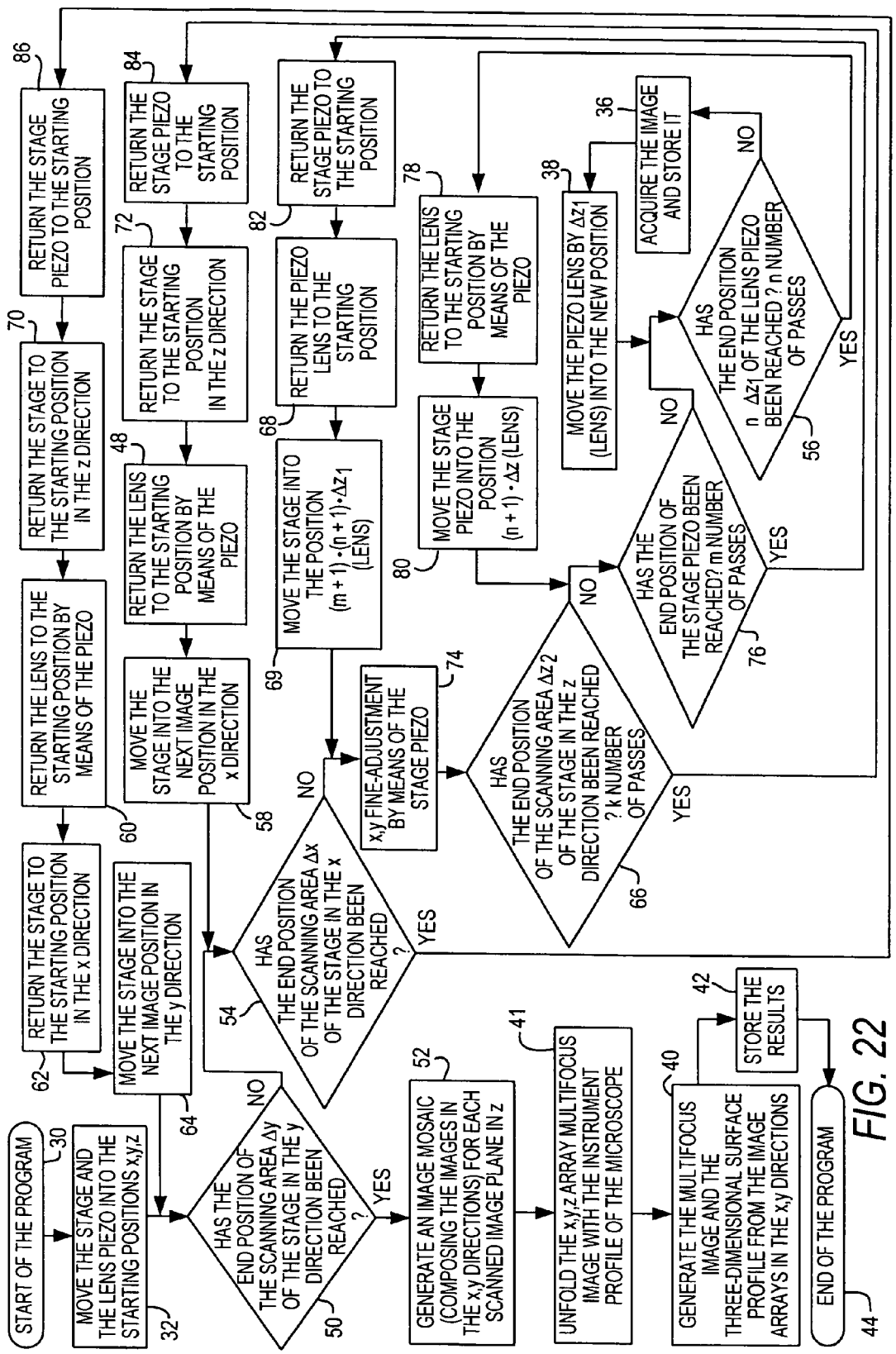
FIG. 22 a process sequence of another improved method for examining an object with a piezo-controlled and electro-mechanically controlled object stage and with a piezo-controlled lens.
Figure 23:
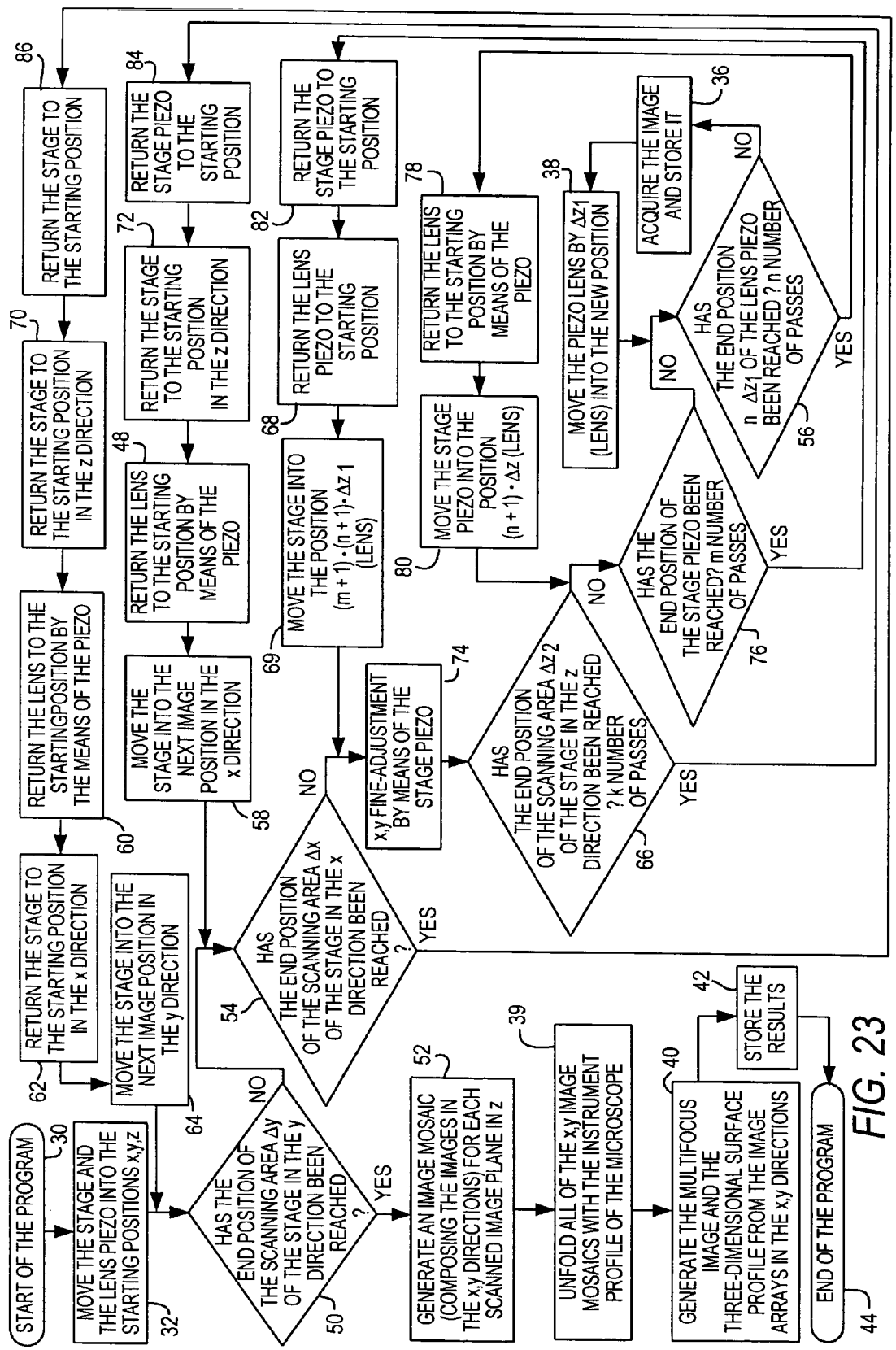
FIG. 23 a process sequence of another improved method for examining an object with a piezo-controlled and an electro-mechanically controlled object stage and with a piezo-controlled lens.

Corresponding to the regulating distance $\Delta z_3$ that is now available for adjusting the distance between the lens 10 and the object 12, the method described so far are augmented by another control loop. This method is shown in FIG. 21 on the basis of a flow chart. Here, in step 76, a checking procedure ascertains whether the end position of the object stage piezo actuator has already been reached. Depending on the result, in step 36, either the current image or the lens 10 and the stage piezo 22 are moved by steps 78 and 80 into their new position. In addition, the overall sequence also includes steps 82, 84 and 86, in which the stage piezo 22 is returned to its starting position each time.

Fundamentally, the scanning principle corresponds to the one already described in conjunction with FIG. 11, in which a lens piezo actuator 16 and a stage piezo actuator 22 are likewise employed. Here, a very precise, high-resolution and fast scanning of the individual image planes can be carried out for the reconstruction of a three-dimensional surface image and of a very high-resolution image. Owing to the additional use of a stage 14 that can be electro-mechanically adjusted in the three spatial directions x,y,z, the method according to FIG. 11 can be advantageously combined with the method according to FIG. 17. In this manner, the coarse range as well as the fine range can be coordinated in such a way that a seamless joining of the fine scanning areas can be effectuated by a suitable movement value of the electromagnetic stage in the z direction. Therefore, the combination of both embodiments allows a considerable increase in the fine scanning area available in the z direction.

As is shown schematically in FIG. 21, after each x,y shift of the electro-mechanical microscope stage 14, the exact desired position can be fine-adjusted with the stage piezo 22. This is done by means of a suitably acting offset of the position of the object 12 in x and y by the stage piezo 22 once the new x,y position of the object had been pre-adjusted by the electro-mechanical stage 14.

The computation of the overlapping area of adjacent images can be dispensed with in the generation of the image mosaic since the individual images that constitute the mosaic can be approached so precisely that adjacent images touch each other with the precision of one pixel. Thus, the individual mosaic images in the touching method, the so-called touché method, can be juxtaposed with each other. This method for mosaic generation is currently the fastest and most robust method since the quality factors that determine the image mosaic depend exclusively on the precise positioning of the object 12. This can be done through the exact electro-mechanical positioning of the stage 14 and the precise actuation of the stage piezo 14 in the x, y and z directions. In this manner, there is no need for an image analysis in order to compute the overlapping area of adjacent images. By eliminating the need for this time-consuming autocorrelation method—in addition to its being robust and independent of the image content—a high speed is achieved and rapidly changeable processes on microscopic surfaces can be detected at a high resolution.

LIST OF REFERENCE NUMERALS

10 lens
12 object
14 object stage
15 surface of the object stage facing the lens
16 lens piezo actuator
17 surface of the object stage facing away from the lens
18 piezo control device
20 piezo control device
21 electro-mechanical movement control device
22 object stage piezo actuator
30 start of the process
32 reaching the starting position
34 determination "Has the end position been reached?"
36 acquiring and storing the image
37 movement $\Delta z$ of the object stage piezo actuator
38 movement of the lens
39 deconvolution of the individual images
40 generation of the multifocus image
41 deconvolution of the multifocus image
42 storage of the result
44 end of the process
46 determination "Has the end position of the lens piezo been reached?"
48 moving the lens into the starting position
50 determination "Has the end position of the stage in the y direction been reached?"
52 generating the image mosaic
54 determination "Has the end position of the stage in the x direction been reached?"
56 determination "Has the end position of the lens piezo been reached?"
58 moving the stage into the next x position
60 returning the lens to the starting position
62 returning the stage to the x starting position
64 moving the stage into the next y position
66 determination "Has the end position of the stage in the z direction been reached?"
68 returning the lens to the staring position
69 moving the stage into the next z position
70 returning the lens to the z starting position
72 returning the lens to the z staring position
74 fine-adjustment x,y direction
76 determination "Has the end position of the stage in the z direction been reached?"
78 returning the lens to the starting position
80 moving the stage piezo into the next z position
82 returning the stage piezo to the starting position
84 returning the stage piezo to the starting position
86 returning the stage piezo to the starting position
d distance between the object and the lens Δx movement in the z direction
Δy movement in the y direction
Δz movement in the z direction

What is claimed is:

1. A device for optically examining an object, comprising:
   a lens;
   an object stage configured to receive the object;
   an image-recording apparatus configured to record a plurality of images of the object in a plurality of planes;
   a piezo-controlled apparatus configured to adjust a distance between the lens and the object prior to the recording of each of the images; and
   an image-generating apparatus configured to generate a multifocus image from the plurality of images by:
      separating sharp image areas from unsharp image areas so as to provide a respective partial set of areas from each of the plurality of images, wherein the areas have a high sharpness of detail;
      determining a respective result image from each respective partial set of areas; and then
      combining the result images so as to form the multifocus image.

2. The device as recited in claim 1 wherein the piezo-controlled apparatus is coupled to the lens.

3. The device as recited in claim 1 wherein the piezo-controlled apparatus is coupled to the object stage.

4. The device as recited in claim 2 further comprising another piezo-controlled apparatus coupled to the object stage.

5. The device as recited in claim 3 wherein the piezo-controlled apparatus includes a piezo actuator disposed on the object stage so as to enable the object to be disposed on the piezo actuator.

6. The device as recited in claim 4 wherein the another piezo-controlled apparatus includes a piezo actuator disposed on the object stage so as to enable the object to be disposed on the piezo actuator.

7. The device as recited in claim 2 wherein the object stage is movable in x, y and z directions using an electro-mechanical adjustment unit.

8. The device as recited in claim 3 wherein the object stage is movable in x, y and z directions using an electro-mechanical adjustment unit.

9. The device as recited in claim 4 wherein the object stage is movable in x, y and z directions using an electro-mechanical adjustment unit.

10. The device as recited in claim 1 wherein the image-generating apparatus is configured to deconvolute the multifocus image using an instrument function.

11. The device as recited in claim 1 wherein the image-generating apparatus is configured to deconvolute each of the individual image using an instrument function.

12. The device as recited in claim 7 wherein the image-generating apparatus is configured to generate an image mosaic.

13. The device as recited in claim 8 wherein the image-generating apparatus is configured to generate an image mosaic.

14. The device as recited in claim 9 wherein the image-generating apparatus is configured to generate an image mosaic.

15. The device as recited in claim 10 wherein the image-generating apparatus is configured to generate an image mosaic.

16. The device as recited in claim 11 wherein the image-generating apparatus is configured to generate an image mosaic.

17. A method for examining an object, comprising:
    recording a plurality of images using a lens and an image-recording device;
    adjusting a position of a focal plane of the lens in the object using a piezo-controlled device prior to the recording of each of the images;
    separating sharp image areas from unsharp image areas so as to provide a respective partial set of areas from each of the plurality of images, wherein the areas have a high sharpness of detail;
    determining a respective result image from each respective partial set of areas; and then
    combining the result images so as to form a multifocus image.

18. The method as recited in claim 17 wherein the adjusting is performed so as to record first, second and third image of the plurality of images at respective first, second and third positions of the focal plane, the second position being equidistant from the first and third positions.

19. The method as recited in claim 17 further comprising deconvoluting each of the images using an instrument function of the optical imaging device after the recording of each of the plurality of images.

20. The method as recited in claim 17 further comprising deconvoluting each of the images using an instrument function of the optical imaging device after the recording of all of the plurality of images.

21. The method as recited in claim 17 further comprising deconvoluting the multifocus image using an instrument function of the optical imagining device so as to provide an enhanced multifocus image having enhanced sharpness of detail.

22. The method as recited in claim 17 wherein the piezo-controlled device includes a first piezo actuator disposed on the lens and a second piezo actuator disposed on an object stage and wherein the adjusting is performed by actuating the first and second piezo actuators using respective control devices so as to change relative extensions of the first and second piezo actuators in a z direction.

23. The method as recited in claim 22 further comprising moving the object stage in an x or y or the z direction using an electro-mechanical adjustment unit so to position the object.

24. The method as recited in claim 22 wherein each of the plurality of images is a mosaic image formed by recording a plurality of sub-images at each position of the focal plane.

25. The method as recited in claim 24 further comprising deconvoluting each mosaic image using an instrument function of the optical imaging device before the combining.

26. The method as recited in claim 24 further comprising deconvoluting the multifocus image using an instrument function of the optical imaging device so as to provide an enhanced multifocus image having enhanced sharpness of detail.

27. A device for optically examining an object, comprising:
    a conventional light microscope including:
       a lens;
       an object stage configured to receive the object; and
       an image-recording apparatus configured to record a plurality of images of the object in a plurality of planes;
    a piezo-controlled apparatus configured to adjust a distance between the lens and the object so as to bring each of the plurality of planes into a focus of the lens; and
    an image-generating apparatus configured to generate a multifocus image by combining sharp image areas of the plurality of images.

28. A device for optically examining an object, comprising:
a conventional light microscope including:
   a lens;
   an object stage configured to receive the object;
   an image-recording apparatus configured to record a plurality of images of the object in a plurality of planes; and
   a stage adjustment unit configured to adjust a position of the object stage in a z-direction;
a piezo apparatus configured to adjust a position of the lens in the z-direction so that a combination of an adjustment by the stage adjustment unit and the piezo apparatus together adjusts a distance between the lens and the object so as to bring each of the plurality of planes into a focus of the lens; and
an image-generating apparatus configured to generate a multifocus image by combining sharp image areas of the plurality of images.

29. A device for optically examining an object, comprising:
a conventional light microscope including:
   a lens;
   an object stage configured to receive the object; and
   an image-recording apparatus configured to record a plurality of images of the object in a plurality of planes;
a first piezo-controlled device including a first piezo actuator disposed on the lens and configured to adjust a position of the object stage;
a second piezo-controlled device including a second piezo actuator disposed on the object stage and configured to adjust a position of the lens so as to, together with the first piezo actuator, adjust a distance between the lens and the object so as to bring each of the plurality of planes into a focus of the lens; and
an image-generating apparatus configured to generate a multifocus image by combining sharp image areas of the plurality of images.

* * * * *